United States Patent
Park et al.

(10) Patent No.: US 10,903,887 B2
(45) Date of Patent: Jan. 26, 2021

(54) METHOD FOR TRANSMITTING AND RECEIVING CHANNEL STATE INFORMATION IN WIRELESS COMMUNICATION SYSTEM AND DEVICE THEREFOR

(71) Applicant: LG Electronics Inc., Seoul (KR)

(72) Inventors: Haewook Park, Seoul (KR); Heejin Kim, Seoul (KR); Sangrim Lee, Seoul (KR); Jiwon Kang, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/347,411

(22) PCT Filed: Nov. 3, 2017

(86) PCT No.: PCT/KR2017/012385
§ 371 (c)(1),
(2) Date: May 3, 2019

(87) PCT Pub. No.: WO2018/084622
PCT Pub. Date: May 11, 2018

(65) Prior Publication Data
US 2019/0312623 A1    Oct. 10, 2019

Related U.S. Application Data

(60) Provisional application No. 62/417,252, filed on Nov. 3, 2016.

(51) Int. Cl.
H04B 7/06    (2006.01)
H04B 17/336  (2015.01)
(Continued)

(52) U.S. Cl.
CPC ........... *H04B 7/0626* (2013.01); *H04B 7/043* (2013.01); *H04B 7/0456* (2013.01); *H04B 7/06* (2013.01);
(Continued)

(58) Field of Classification Search
CPC ........ H04B 7/043; H04B 7/0456; H04B 7/06; H04B 7/0617; H04B 7/0626; H04B 7/063; H04B 7/066; H04L 5/0051
See application file for complete search history.

(56) References Cited

U.S. PATENT DOCUMENTS

2012/0076023 A1* 3/2012 Ko ................. H04L 5/0053
                                              370/252
2014/0198869 A1   7/2014 Melzer et al.
(Continued)

FOREIGN PATENT DOCUMENTS

WO    2016/039565 A1    3/2016
WO   WO2017/166219 A1 * 10/2017

OTHER PUBLICATIONS

ZTE; "Discussion on CSI Process and CSI-RS Resource Definitions"; 3GPP TSG RAN WG1 Meeting #82 Beijing, China, Aug. 24-28, 2015; R1- 154378 (Year: 2015).*

(Continued)

*Primary Examiner* — Gary Mui
(74) *Attorney, Agent, or Firm* — Dentons US LLP

(57) ABSTRACT

In an aspect of the present invention, a method for transmitting channel state information (CSI) of terminal in a wireless communication system may include: receiving a CSI-reference signal (RS); generating a first matrix for a channel based on the CSI-RS; generating a second matrix having a lower dimension than the first matrix by calculating the first matrix and an orthogonal beam matrix having a lower dimension than the first matrix; and transmitting to a (Continued)

base station information on the second matrix and/or the orthogonal beam matrix as the CSI, in which the orthogonal beam matrix may be a matrix including a plurality of orthogonal beams orthogonal to each other as elements.

14 Claims, 22 Drawing Sheets

(51) Int. Cl.
*H04B 7/0426* (2017.01)
*H04B 7/0456* (2017.01)
*H04L 5/00* (2006.01)

(52) U.S. Cl.
CPC ......... *H04B 7/066* (2013.01); *H04B 17/336* (2015.01); *H04L 5/0051* (2013.01)

(56) References Cited

U.S. PATENT DOCUMENTS

| | | |
|---|---|---|
| 2015/0016379 A1 | 7/2015 | Nam et al. |
| 2017/0150480 A1* | 5/2017 | Kim ..................... H04L 67/12 |
| 2017/0302353 A1* | 10/2017 | Rahman ............... H04B 7/0486 |
| 2018/0034519 A1* | 2/2018 | Rahman ................ G16H 50/50 |
| 2018/0083676 A1* | 3/2018 | Wei ...................... H04B 7/0452 |
| 2019/0028158 A1* | 1/2019 | Park ..................... H04B 7/0626 |
| 2019/0058560 A1* | 2/2019 | Chen .................... H04W 24/08 |

OTHER PUBLICATIONS

Motorola, "Low-Overhead Feedback of Spatial Covariance Matrix", R1-094844, 3GPP TSG RANI #59, Jeju, South Korea, Nov. 3, 2009.
Sim, Min Soo et al., "Cpmpressed Channel Feedback for Correlated Massive MIMO Systems", ArXiv: 1503.09002V1 [es.IT], Mar. 31, 2015, pp. 4-8.

* cited by examiner

Fig. 7
(a)
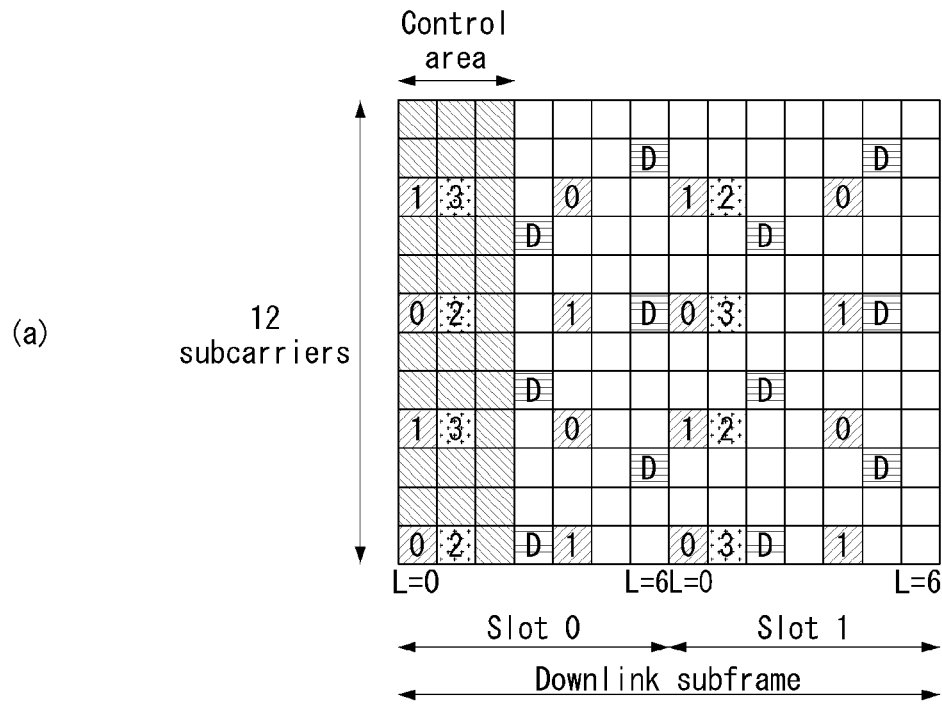
(b)
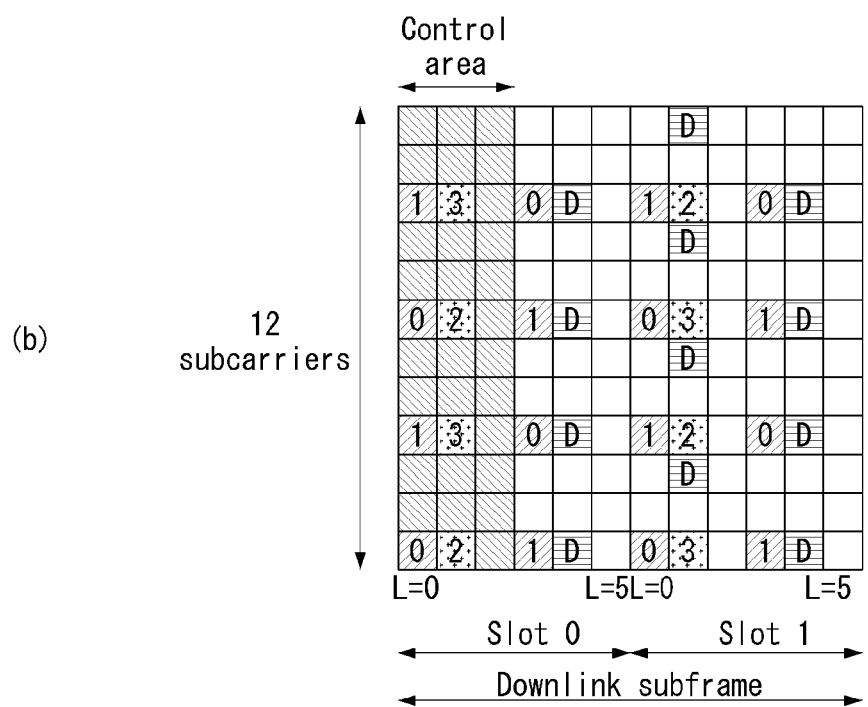

Fig. 9

1 or 2 ports (a)

4 ports (b)

8 ports (c)

Fig. 13
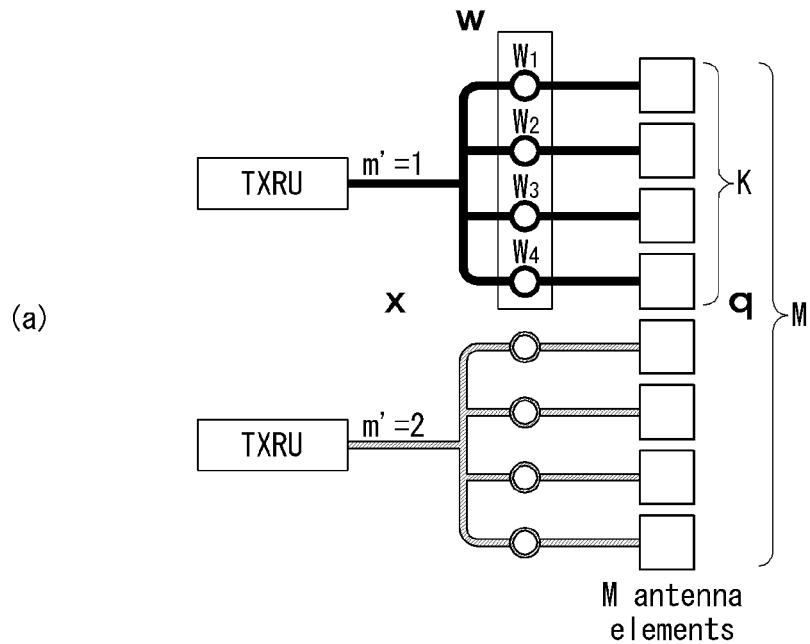
(a)
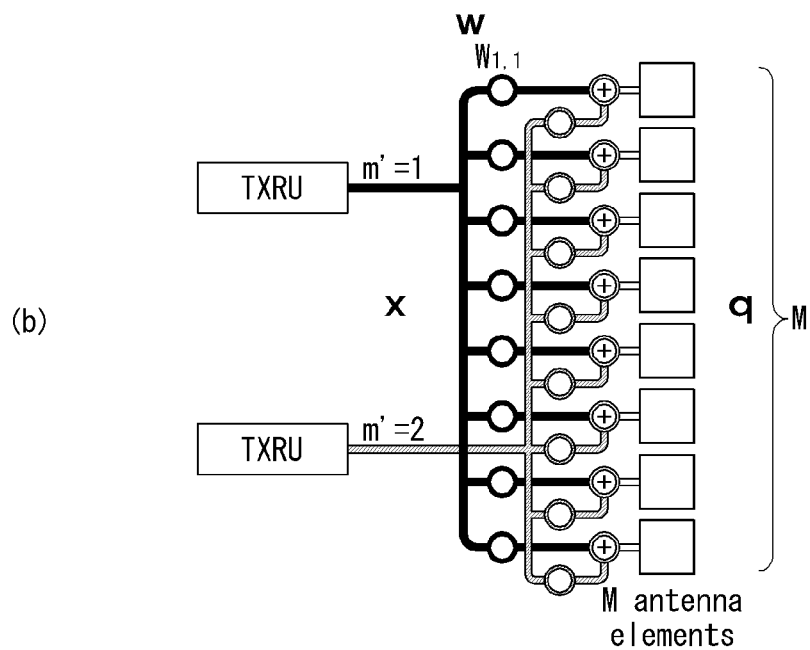
(b)

1st domain beam index

Rank 3-4

Config 2

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 0 | 1 |   |   | 0 | 1 |   |   |   |   |    |    |    |    |    |    |
| 1 | 2 | 3 |   |   | 2 | 3 |   |   |   |   |    |    |    |    |    |    |
| 2 |   |   |   |   |   |   |   |   |   |   |    |    |    |    |    |    |
| 3 |   |   |   |   |   |   |   |   |   |   |    |    |    |    |    |    |
| 4 |   |   |   |   |   |   |   |   |   |   |    |    |    |    |    |    |
| 5 |   |   |   |   |   |   |   |   |   |   |    |    |    |    |    |    |
| 6 |   |   |   |   |   |   |   |   |   |   |    |    |    |    |    |    |
| 7 |   |   |   |   |   |   |   |   |   |   |    |    |    |    |    |    |

2nd domain beam index

METHOD FOR TRANSMITTING AND RECEIVING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/012385, filed on Nov. 3, 2017, which claims the benefit of U.S. Provisional Application No. 62/417,252, filed on Nov. 3, 2016, the contents of which are all hereby incorporated by reference herein in their entirety.

TECHNICAL FIELD

The present invention relates to a wireless communication system, and more particularly, to a method for transmitting and receiving channel state information and a device for performing/supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention provides a method for transmitting and receiving channel state information (CSI).

Furthermore, an embodiment of the present invention provides a method for transmitting and receiving explicit channel state information.

Furthermore, an embodiment of the present invention is to solve a signaling overhead increase problem which may occur when transmitting and receiving explicit channel state information.

The technical objects of the present invention are not limited to the aforementioned technical objects, and other technical objects, which are not mentioned above, will be apparently appreciated by a person having ordinary skill in the art from the following description.

Technical Solution

In an aspect of the present invention, a method for transmitting channel state information (CSI) of terminal in a wireless communication system may include: receiving a CSI-reference signal (RS); generating a first matrix for a channel based on the CSI-RS; generating a second matrix having a lower dimension than the first matrix by calculating the first matrix and an orthogonal beam matrix having a lower dimension than the first matrix; and transmitting to a base station information on the second matrix and/or the orthogonal beam matrix as the CSI, in which the orthogonal beam matrix may be a matrix including a plurality of orthogonal beams orthogonal to each other as elements.

Furthermore, step of the generating of the second matrix may be step of obtaining the second matrix by projecting the first matrix to the orthogonal beam matrix.

Furthermore, the first matrix may correspond to a channel covariance matrix or a dominant eigen matrix having an eigen vector as the element.

Furthermore, when the first matrix corresponds to the channel covariance matrix, the second matrix may be generated according to Equation 1.

$$R(\in C^{m \times m}) = Q^H H^H H Q, Q = [q_1, q_2, \ldots, q_m] \in C^{N_T \times m} \quad \text{[Equation 1]}$$

Where the R represents the second matrix having m×m dimensions, the Q represents the orthogonal beam matrix having N_T×m dimension with q_1 to q_m which are m orthogonal beams as the elements, the N_T represents the number of transmission antennas, the Q^H represents a hermitian matrix of the Q, and the $H^H H$ represents the channel covariance matrix having N_T×N_T dimensions.

Furthermore, when the first matrix corresponds to the dominant eigen matrix, the second matrix may be generated according to Equation 2.

$$R(\in C^{m \times m}) = Q^H U_k U_k^H Q, U_k = [u_1, u_2, \ldots u_k] \in C^{N_T \times k}, \text{ or}$$

$$R(\in C^{m \times m}) = Q^H U_k \Sigma_k U_k^H Q, \Sigma_k = \text{diag}[\sigma_1^2, \sigma_2^2, \ldots, \sigma_k^2] \in C^{k \times k} \quad \text{[Equation 2]}$$

Where the R represents the second matrix having m×m dimensions, the Q represents the orthogonal beam matrix having N_T×m dimension with q_1 to q_m which are m orthogonal beams as the elements, the N_T represents the number of transmission antennas, the Q^H represents the hermitian matrix of the Q, the U_k represents an eigen matrix having N_T×k dimensions with k eigen vectors as the elements, and the (U_k)^H represents the hermitian matrix of the U_k.

Furthermore, the k value may be determined in association with a rank indicator (RI) for the number of ranks.

Furthermore, the RI may be explicitly indicated or implicitly indicated through the number of dominant eigen values whose absolute values are dominant among the eigen values obtained through the second matrix.

Furthermore, the orthogonal beam matrix may be constituted by the plurality of orthogonal beams satisfying a predetermined condition among orthogonal beams in an orthogonal beam set determined based on a reference beam.

Furthermore, the orthogonal beam matrix may be constituted by orthogonal beams in which a value calculated through Equation 3 exceeds a threshold value or k orthogonal beams selected in an order in which the value calculated through Equation 3 is larger among the orthogonal beams in the orthogonal beam set.

$$|q_i^H H^H H q_i| \quad \text{[Equation 3]}$$

Where the q_i represents a matrix of an ith orthogonal beam included in the orthogonal beam set, the (q_i)^H represents the hermitian matrix of the q_i, the H represents a channel matrix, and the H_H represents the hermitian matrix of the H.

Furthermore, the threshold value may be set to a predetermined value or indicated through a radio resource control (RRC) signaling.

Furthermore, the k may represent the number of dominant eigen vectors.

Furthermore, the orthogonal beam matrix may be constituted by orthogonal beams selected based on a signal-to-interference-plus-noise ratio (SINR) value or a correlation value with the dominant eigen vector within the orthogonal beam set.

Furthermore, the plurality of orthogonal beams of the orthogonal beam matrix may be determined based on a codebook configuration configured by a user equipment (UE).

Furthermore, information on the orthogonal beam matrix may include an index of a beam group in which the plurality of orthogonal beams are grouped and a rank indicator indicating the number of ranks.

Furthermore, when the codebook configuration configured by the UE corresponds to a beam group including non-orthogonal beams which do not have orthogonality to each other, the information on the orthogonal beam matrix may further include indication information regarding orthogonal beams satisfying the orthogonality and selected to constitute the orthogonal beam matrix among the beams included in the beam group.

Furthermore, the information on the orthogonal beam matrix may be transmitted in a wideband and/or a long-term period and information on the second matrix may be transmitted in a subband and/or a short-term period.

Furthermore, the CSI may not include a channel quality indicator (CQI) and the RI or further include a CQI and an RI calculated based on a precoding matrix index (PMI) calculated by assuming a predetermined precoder.

In another aspect of the present invention, a terminal receiving a channel state information (CSI)-reference signal (RS) in a wireless communication system may include: a radio frequency (RF) unit transmitting and receiving a radio signal; and a processor for controlling the RF unit, in which the processor may be configured to receive a CSI-reference signal (RS), generate a first matrix for a channel based on the CSI-RS, generate a second matrix having a lower dimension than the first matrix by calculating the first matrix and an orthogonal beam matrix having a lower dimension than the first matrix, and transmit to a base station information on the second matrix and/or the orthogonal beam matrix as the CSI, and the orthogonal beam matrix may be a matrix including a plurality of orthogonal beams orthogonal to each other as elements.

Advantageous Effects

According to an embodiment of the present invention, a user equipment (UE) can smoothly derive and feed back CSI to an eNB.

Furthermore, according to an embodiment of the present invention, since the UE reports explicit CSI to the eNB, there is an effect that the eNB can more accurately estimate/measure a channel/channel state. That is, according to an embodiment of the present invention, estimation/measurement performance of the channel/channel state is enhanced.

Furthermore, according to an embodiment of the present invention, even though an explicit CSI feedback/reporting scheme is adopted, there is an advantage that signaling overhead does not significantly increase.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 7 illustrates reference signal patterns mapped to downlink resource block pairs in a wireless communication system to which the present invention may be applied.

FIG. 9 illustrates resources to which reference signals are mapped in a wireless communication system to which the present invention is applicable.

FIG. 13 illustrates transceiver unit models in a wireless communication system to which the present invention is applicable.

FIG. 19 illustrates a beam pattern in the case of (N1,N2)=(4,2), (o1,o2)=(4,4), Rank 3-4, (m1,m2)=(0,0), and Codebook Config=2 according to an embodiment of the present invention.

BEST MODE

Figure 1:
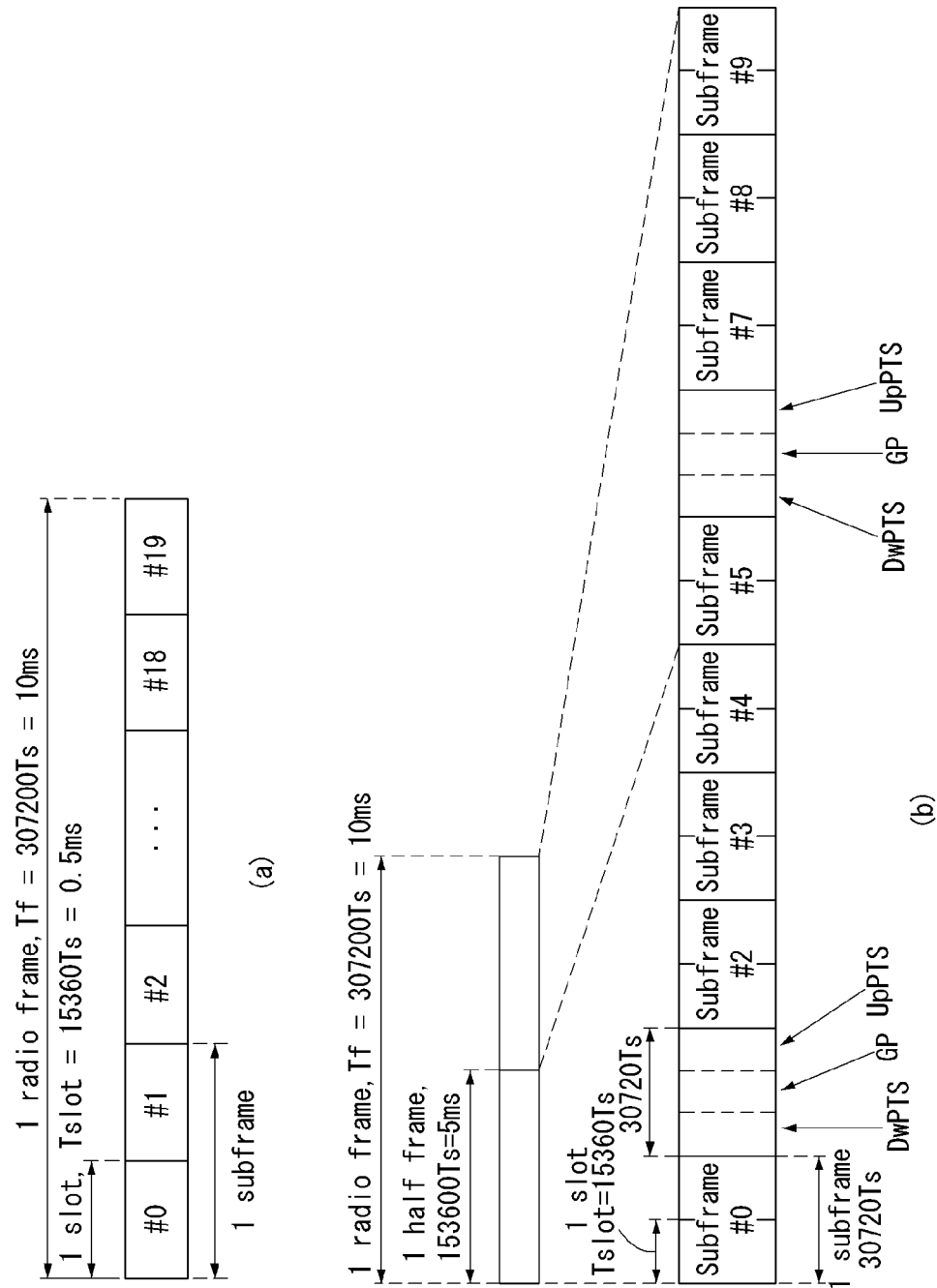
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(*a*) exemplifies a radio frame structure type 1. The type 1 radio frame may be applied to both of full duplex FDD and half duplex FDD.

A radio frame includes 10 subframes. A radio frame includes 20 slots of $T\_{slot}=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | Extended cyclic prefix in uplink | DwPTS | UpPTS Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | | — |
| 8 | 24144 · $T_s$ | | | — | | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
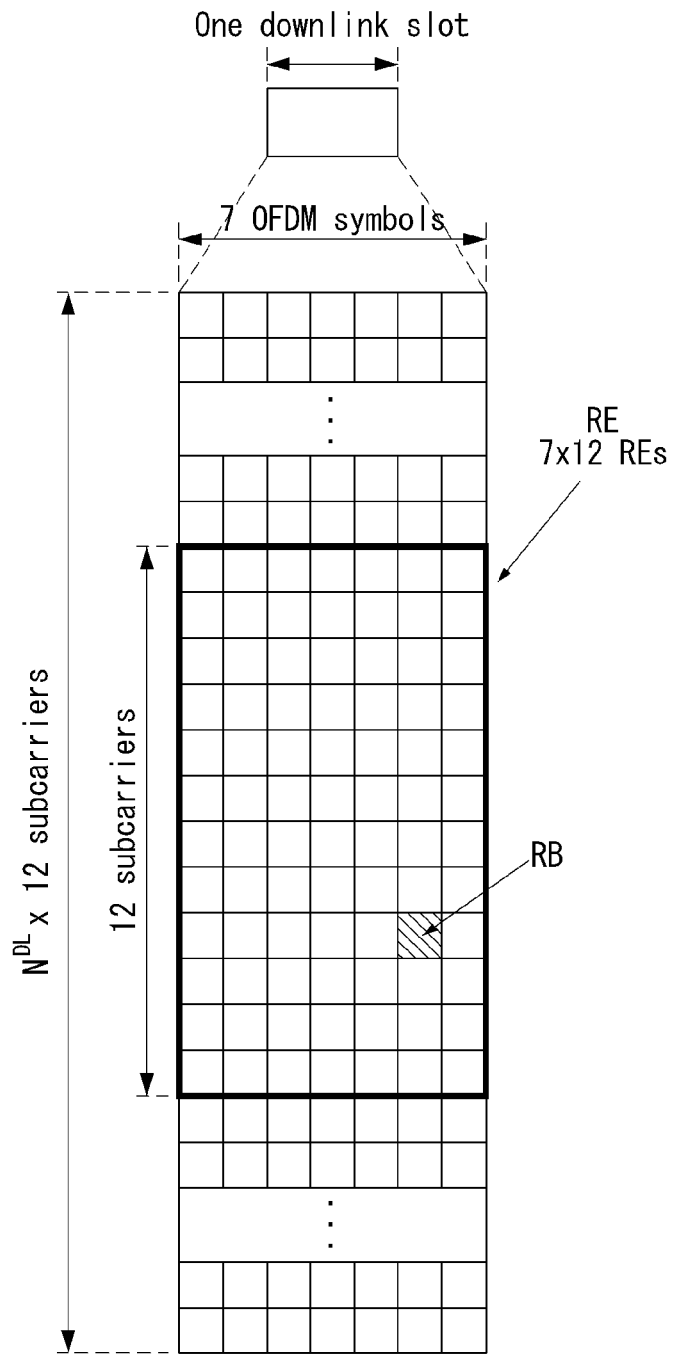
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
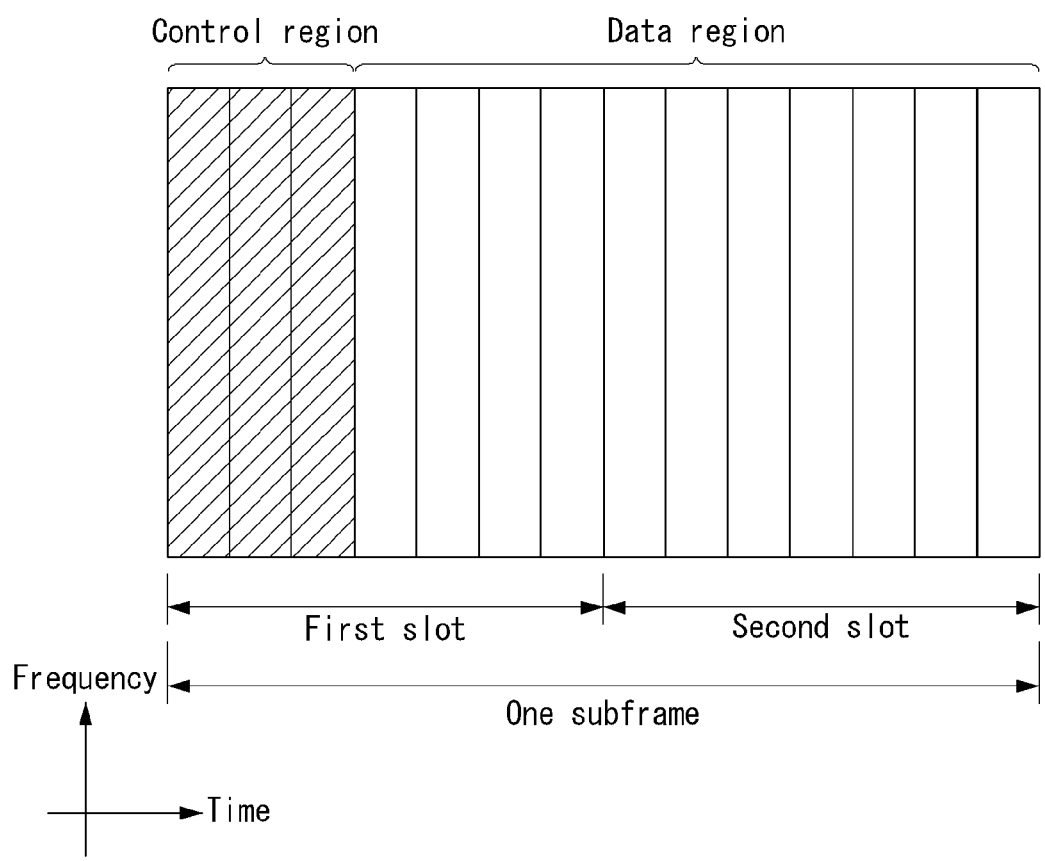
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
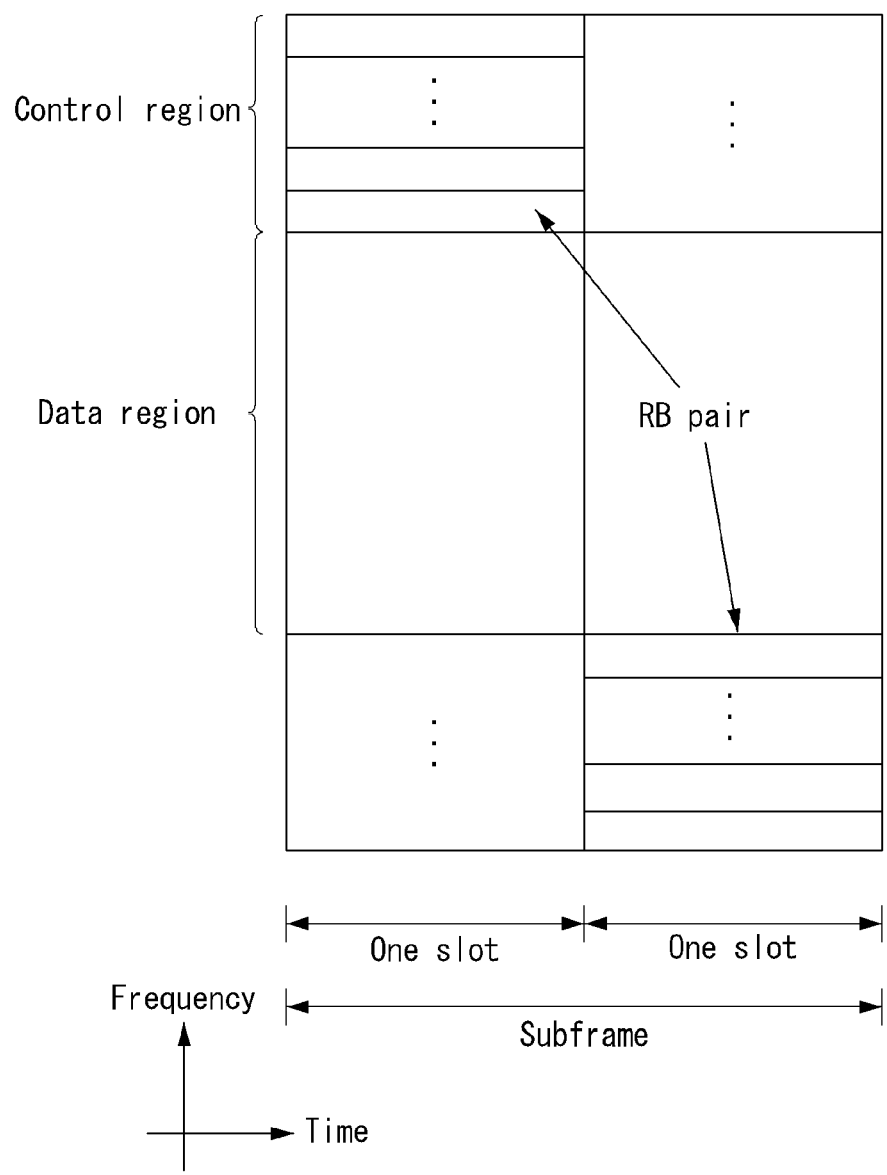
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
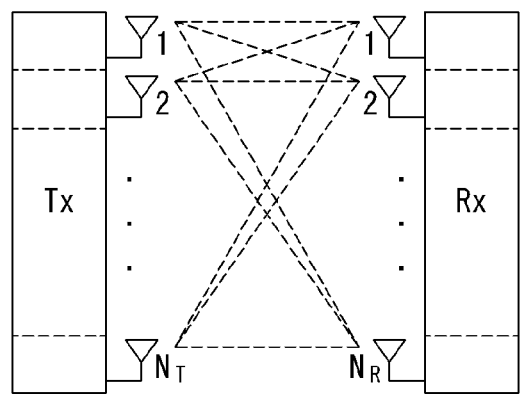
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T$$ [Equation 2]

Meanwhile, transmission power may be different in each of pieces of transmission information s_1, s_2, s_NT. In this case, if pieces of transmission power are P_1, P_2, P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_2 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\ldots,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
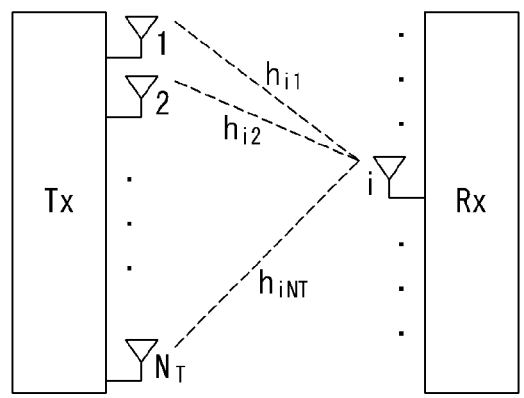
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\ldots,h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n=[n_1,n_2,\ldots,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \le \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f$=15 kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m') \quad \text{[Equation 12]}$$

$$k = k' + 12m +$$

$$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p' \in \{19, 20\}, \text{ extended cyclic prefix} \\ -9 & \text{for } p' \in \{21, 22\}, \text{ extended cyclic prefix} \end{cases}$$

$$l = l' +$$

$$\begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2   0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |

TABLE 3-continued

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8:
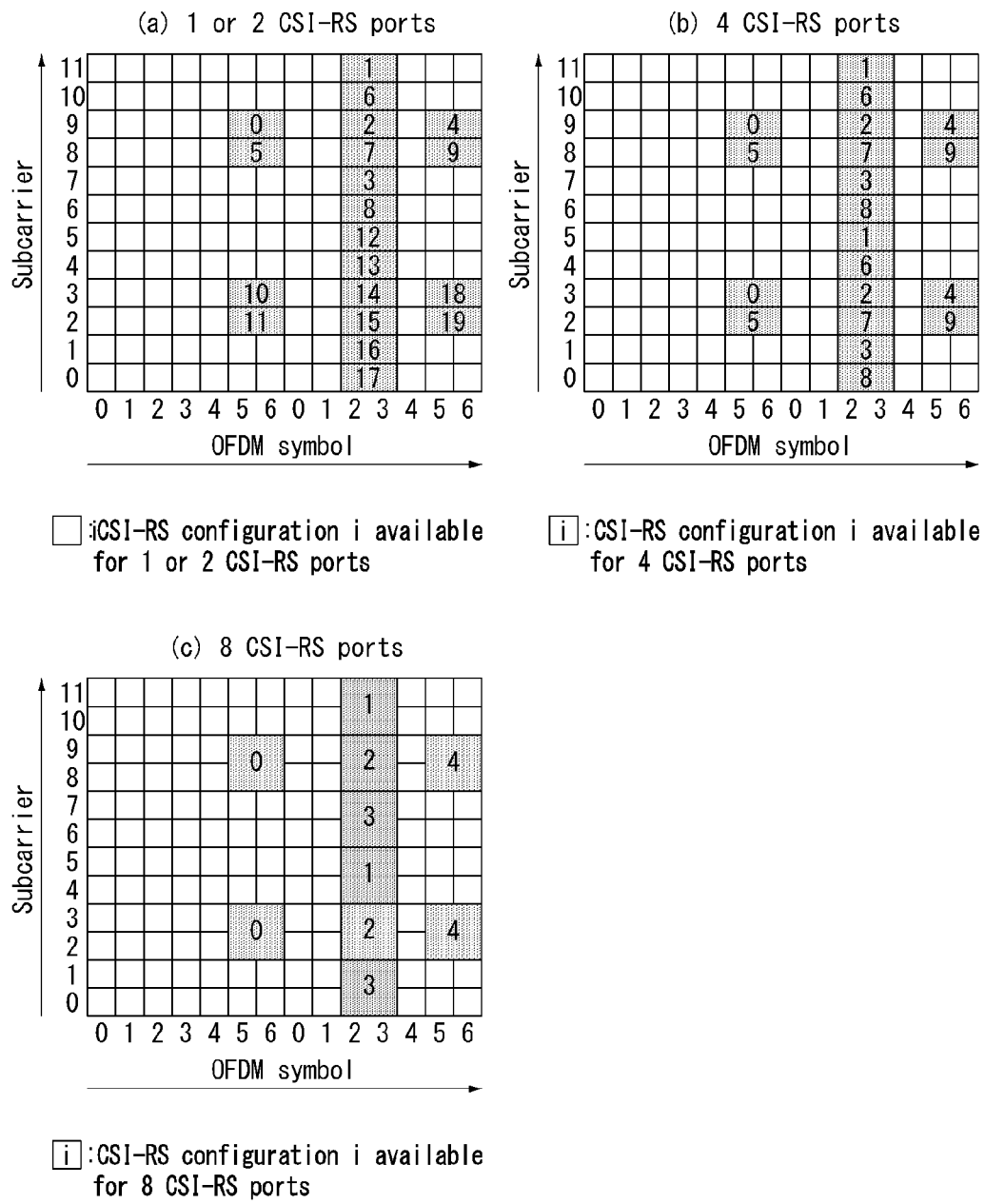
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied. Particularly, FIG. 8 illustrates CSI-RS patterns for cases in which the number of CSI-RS antenna ports is 1 or 2, 4 and 8 in a subframe to which a normal CP is applied.

FIG. 8(a) shows twenty types of CSI-RS configurations available for

CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM (Code Division Multiplexing) for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

Figure 9:
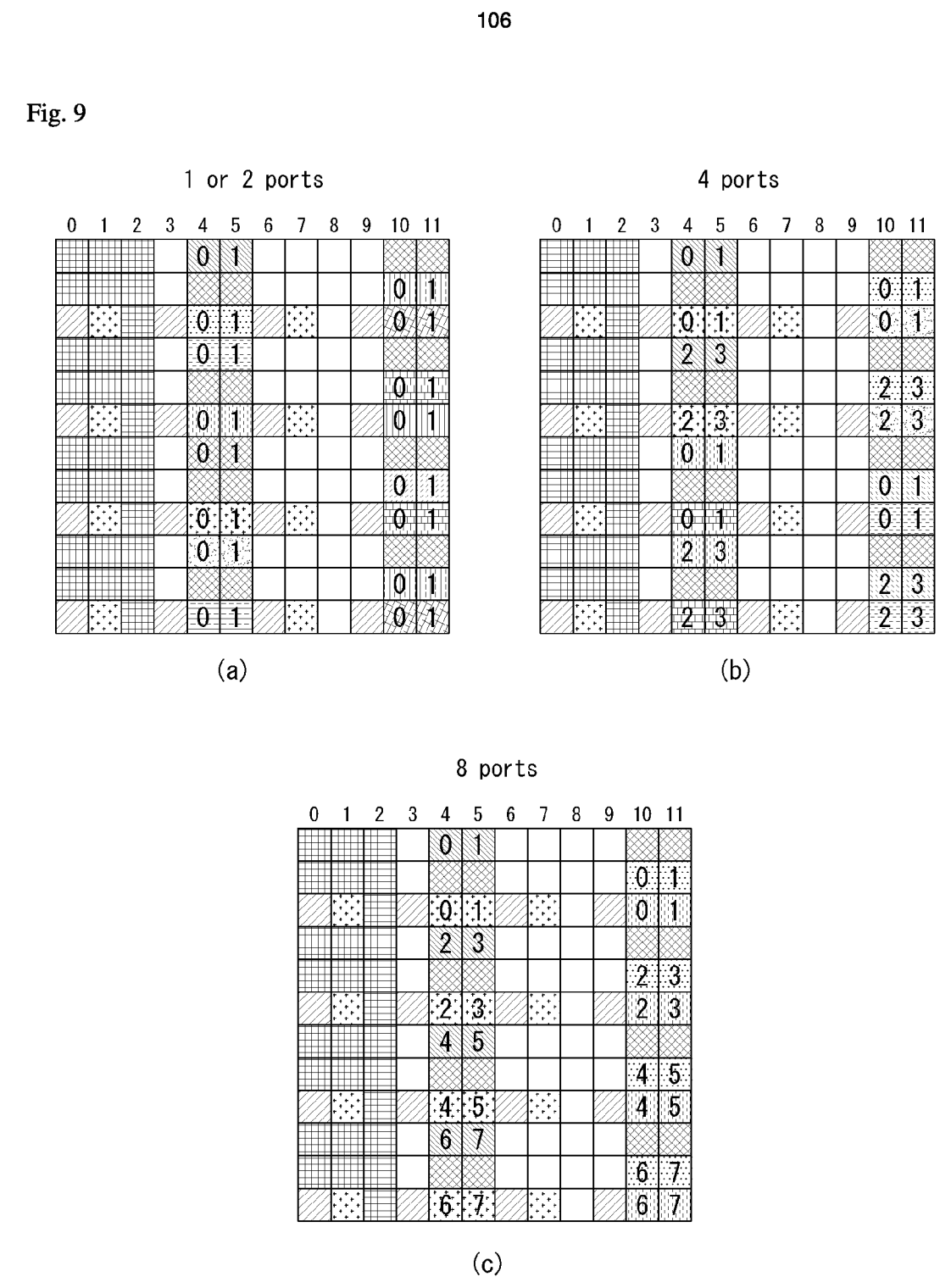

FIG. 9 illustrates resources to which reference signals are mapped in a wireless communication system to which the present invention is applicable.

Particularly, FIG. 9 shows CSI-RS patterns for cases in which the number of CSI-RS antenna ports is 1 or 2, 4 and 8 in a subframe to which an extended CP is applied.

FIG. 9(a) shows 16 CSI-RS configurations which can be used for CSI-RS transmission through 1 or 2 CSI-RS antenna ports, FIG. 9(b) shows 8 CSI-RS configurations which can be used for CSI-RS transmission through 4 CSI-RS antenna ports, and FIG. 9(c) shows 4 CSI-RS configurations which can be used for CSI-RS transmission through 8 CSI-RS antenna ports.

In this manner, radio resources (i.e., RE pairs) for CSI-RS transmission are determined depending on each CSI-RS configuration.

When one or two antenna ports are set for CSI-RS transmission for a specific cell, CSI-RSs are transmitted on radio resources according to a set CSI-RS configuration among the 16 CSI-RS configurations shown in FIG. 9(a).

Similarly, when 4 antenna ports are set for CSI-RS transmission for a specific cell, CSI-RSs are transmitted on radio resources according to a set CSI-RS configuration among the 8 CSI-RS configurations shown in FIG. 9(b). Further, when 8 antenna ports are set for CSI-RS transmission for a specific cell, CSI-RSs are transmitted on radio resources according to a set CSI-RS configuration among the 4 CSI-RS configurations shown in FIG. 9(c). A plurality of CSI-RS configurations may be used in a single cell. Only zero or one CSI-RS configuration may be used for a non-zero power (NZP) CSI-RS and zero or multiple CSI-RS configurations may be used for a zero power (ZP) CSI-RS.

For each bit set to 1 in a zero-power (ZP) CSI-RS ('ZeroPowerCSI-RS) that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, CSI-RS periodicity TCSI-RS and a subframe offset ΔCSI-RS are determined depending on CSI-RS subframe configuration ICSI-RS.

The CSI-RS subframe configuration in Table 5 may be set to one of the aforementioned 'SubframeConfig' field and 'zeroTxPowerSubframeConfig' field. The CSI-RS subframe configuration may be separately set for an NZP CSI-RS and a ZP CSI-RS.

A subframe including a CSI-RS satisfies Equation 13.

$$(10n_f+\lfloor n_s/2 \rfloor - \Delta_{CSI-RS}) \mod T_{CSI-RS}=0 \quad \text{[Equation 13]}$$

In Equation 13, TCSI-RS indicates CSI-RS periodicity, ΔCSI-RS indicates a subframe offset value, nf denotes a system frame number, and ns denotes a slot number.

In the case of a UE for which transmission mode 9 is set with respect to a serving cell, a single CSI-RS resource configuration may be set for the UE. In the case of a UE for which transmission mode 10 is set with respect to the serving cell, one or more CSI-RS resource configurations may be set for the UE.

CSI-RS Configuration

The current LTE standard includes antennaPortsCount, subframeConfig, resourceConfig, etc. as parameters regarding a CSI-RS configuration. Such parameters indicate that a CSI-RS is transmitted in how many antenna ports, the cycle and offset of a subframe in which a CSI-RS is to be transmitted, and that a CSI-RS is transmitted at which RE location (e.g., frequency and OFDM symbol index) of a corresponding subframe. Specifically, an eNB transmits the following contents of parameters/information when it indicates/delivers a specific CSI-RS configuration to a UE.

antennaPortsCount: Parameter to represent the number of antenna ports used for transmission of CSI reference signals) (e.g., 1 CSI-RS port, 2 CSI-RS ports, 4 CSI-RS ports, or 8 CSI-RS ports)

resourceConfig: Parameter regarding a CSI-RS assignment resource location subframeConfig: Parameter regarding a subframe cycle and offset in which a CSI-RS is to be transmitted p-C: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size zeroTxPowerResourceConfigList: Parameter regarding a zero-power CSI-RS configuration zeroTxPowerSubframeConfig: Parameter regarding a subframe cycle and offset in which a zero-power CSI-RS is to be transmitted Massive MIMO A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 10:
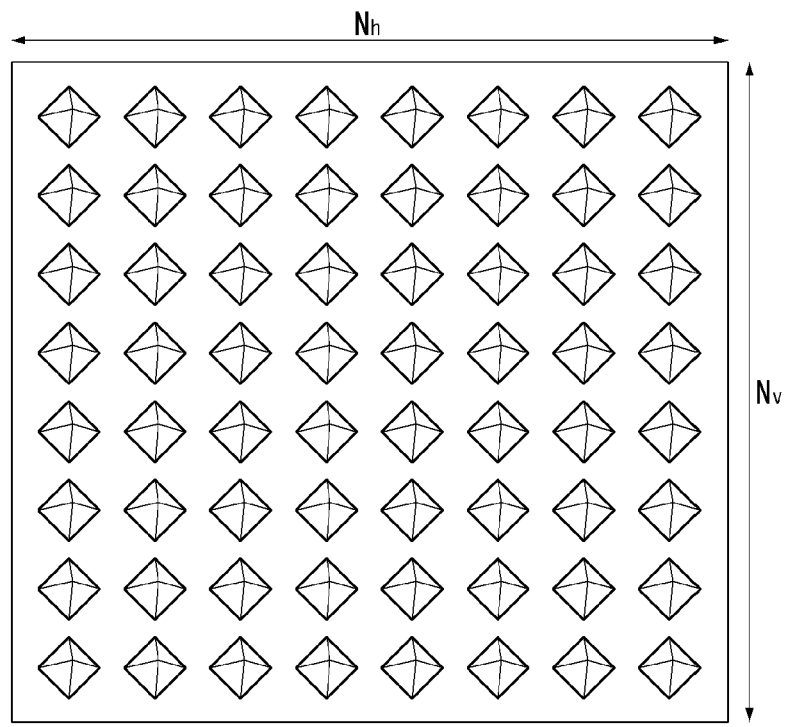
FIG. 10 illustrates a two-dimensional (2D) active antenna system having 64 antenna elements in a wireless communication system to which the present invention is applicable.

FIG. 10 illustrates a 2D AAS having 64 antenna elements in a wireless communication system to which the present invention is applicable.

FIG. 10 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 11:
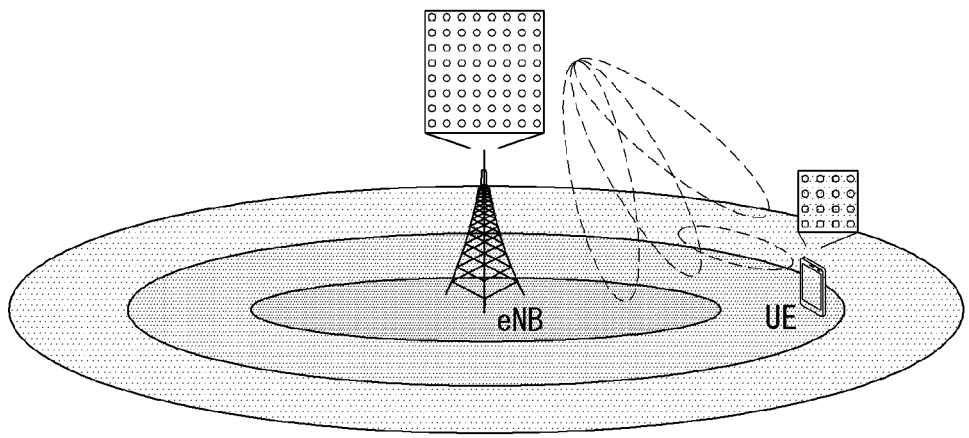
FIG. 11 illustrates a system in which a base station or a UE has a plurality of transmission/reception antennas capable of forming AAS based three-dimensional (3D) beams in a wireless communication system to which the present invention is applicable.

FIG. 11 illustrates a system in which an eNB or a UE has a plurality of transmission/reception antennas capable of forming AAS based 3D beams in a wireless communication system to which the present invention is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
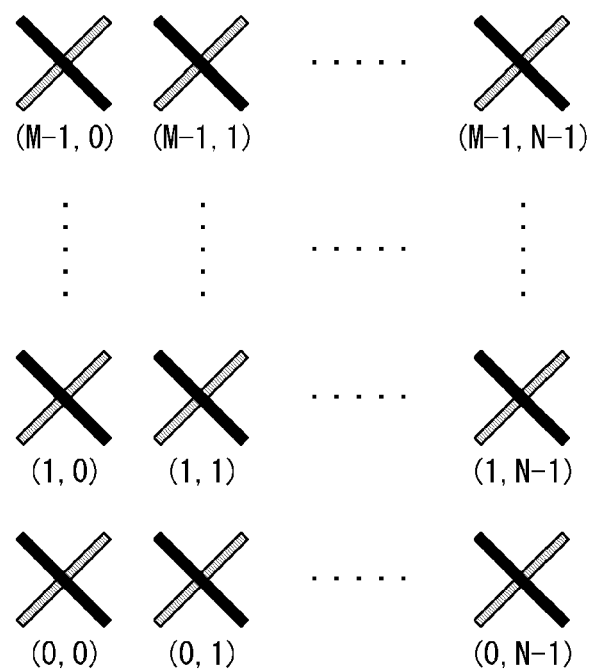
FIG. 12 illustrates a 2D antenna system having cross polarization in a wireless communication system to which the present invention is applicable.

FIG. 12 illustrates a 2D antenna system having cross polarization in a wireless communication system to which the present invention is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 11, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

FIG. 13 illustrates transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 12(a) and TXRU virtualization model option-2: full-connection model as shown in FIG. 12(b) according to correlation between antenna elements and TXRU.

Referring to FIG. 13(a), antenna elements are partitioned into multiple antenna element groups and each TXRU is connected to one of the groups in the case of the sub-array partition model.

Referring to FIG. 13(b), multiple TXRU signals are combined and delivered to a single antenna element (or antenna element array) in the case of the full-connection model.

In FIG. 13, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 13 shows an example of TXRU-to-antenna element mapping and the present invention is not limited thereto. The present invention may be equally applied to mapping between TXRUs and antenna elements realized in various manners in terms of hardware.

Channel-State Information (CSI)-Reference Signal (CSI-RS) Definition

A UE may be configured with a single CSI-RS resource configuration with respect to a serving cell and UE in which the transmission mode 9 has been configured. A UE may be configured with one or more CSI-RS resource configuration(s) with respect to a serving cell and UE in which the transmission mode 10 has been configured. The following parameters for a UE that needs to assume non-zero transmit power for a CSI-RS are configured through higher layer signaling for each CSI-RS resource configuration:

CSI-RS resource configuration identifier (if the transmission mode 10 has been configured in a UE)

Number of CSI-RS ports

CSI-RS configuration

CSI-RS subframe configuration I_(CSI-RS)

The assumption of a UE for reference PDSCH transmit power for CSI feedback (P_c) (if the transmission mode 9 has been configured in the UE)

UE assumption for reference PDSCH transmit power for CSI feedback (P_c) for each CSI process when the transmission mode 10 is configured in a UE. When CSI subframe sets C_(CSI,0) and C_(CSI,1) are configured by a higher layer for a CSI process, P_c for each CSI subframe set of a CSI process is configured.

Pseudo-random sequence generator parameter (n_ID).

A CDM type parameter when a UE is configured with a higher layer parameter CSI-Reporting-Type and a CSI report type is configured as "CLASS A" for a CSI process.

If the transmission mode 10 has been configured in a UE, a higher layer parameter qcl-CRS-Info-r11 for the UE assumption of a QCL type B of CRS antenna ports and CSI-RS antenna ports having the following parameter:

qcl-ScramblingIdentity-r11.

crs-PortsCount-r11.

mbsfn-SubframeConfigList-r11.

P_c is an estimated ratio of PDSCH EPRE to CSI-RS energy per resource element (EPRE) when a UE derives CSI feedback and takes a value within a [−8, 15] dB range as 1 dB step size. In this case, the PDSCH EPRE corresponds to the number of symbols to the ratio of a PDSCH EPRE for a cell-related RS EPRE.

A UE does not expect a configuration of a CSI-RS and PMCH within the same subframe of a serving cell.

In the case of a frame structure type 2 serving cell and 4 CRS ports, a UE does not expect to receive a CSI-RS configuration index belonging to a [20 −31] set in the case of a normal CP or a CSI-RS configuration index belonging to a [16 −27] set in the case of an extended CP.

A UE may assume that the CSI-RS antenna ports of a CSI-RS resource configuration are QCLed with respect to delay spread, Doppler spread, Doppler shift, an average gain and average delay.

A UE in which the transmission mode 10 and QCL Type B have been configured may assume antenna ports 0-3 associated with qcl-CRS-Info-r11 corresponding to a CSI-RS resource configuration, and may assume that antenna ports 15-22 corresponding to a CSI-RS resource configuration has been QCLed with respect to Doppler shift and Doppler spread.

If the transmission mode 10 and a higher layer parameter CSI-Reporting-Type are configured in a UE, CSI-Reporting-Type is configured as "CLASS B", and the number of CSI-RS resources configured for a CSI process is one or more, and QCL type B has been configured, a UE does not expect to receive a CSI-RS resource configuration for a CSI process having a value different from a higher layer parameter qcl-CRS-Info-r11.

In a subframe constructed/configured for CSI-RS transmission, a reference signal sequence $r_{l,n_s}(m)$ may be mapped to complex-valued modulation symbols $a_{k,l}^{(p)}$ used as the reference symbols of an antenna port p. Such mapping depends on a higher layer parameter CDMType.

If CDMType does not correspond to CDM4, mapping according to Equation 14 may be performed.

$$a_{k,l}^{(p')} = w_{l''} \cdot r_{l,n_s}(m') \quad \text{[Equation 14]}$$

$$k = k' + 12m +
\begin{cases}
-0 & \text{for } p' \in \{15, 16\}, \text{ normal cyclic prefix} \\
-6 & \text{for } p' \in \{17, 18\}, \text{ normal cyclic prefix} \\
-1 & \text{for } p' \in \{19, 20\}, \text{ normal cyclic prefix} \\
-7 & \text{for } p' \in \{21, 22\}, \text{ normal cyclic prefix} \\
-0 & \text{for } p' \in \{15, 16\}, \text{ extended cyclic prefix} \\
-3 & \text{for } p' \in \{17, 18\}, \text{ extended cyclic prefix} \\
-6 & \text{for } p' \in \{19, 20\}, \text{ extended cyclic prefix} \\
-9 & \text{for } p' \in \{21, 22\}, \text{ extended cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{normal cyclic prefix}
\end{cases}$$

$$w_{l''} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

If CDMType corresponds to CDM4, mapping according to Equation 15 may be performed.

$$a_{k,l}^{(p')} = w_{p'}(i) \cdot r_{l,n_s}(m') \quad \text{[Equation 15]}$$

$$k = k' + 12m -
\begin{cases}
k'' & \text{for } p' \in \{15, 16, 19, 20\}, normalcyclicprefix, \\
& N_{ports}^{CSI} = 8 \\
k'' + 6 & \text{for } p' \in \{17, 18, 21, 22\}, normalcyclicprefix, \\
& N_{ports}^{CSI} = 8 \\
6k'' & \text{for } p' \in \{15, 16, 17, 18,\}, normalcyclicprefix, \\
& N_{ports}^{CSI} = 4
\end{cases}$$

$$l = l' +
\begin{cases}
l'' & CSI reference signal configurations 0-19, \\
& normal cyclic prefix \\
2l'' & CSI reference signal configurations 20-31, \\
& normal cyclic prefix
\end{cases}$$

$$l'' = 0, 1$$

$$k'' = 0, 1$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$w_{p'}(i)$ in Equation 15 is determined by Table 6. Table 6 shows a sequence $w_{p'}(i)$ for CDM 4.

TABLE 6

| p' | | |
|---|---|---|
| $N_{ports}^{CSI} = 4$ | $N_{ports}^{CSI} = 8$ | $[w_{p'}(0)\ w_{p'}(1)\ w_{p'}(2)\ w_{p'}(3)]$ |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

As more and more communication devices require a larger communication capacity, there is a need for enhanced mobile broadband communication as compared with the existing radio access technology (RAT). Massive machine type communications (MTCs), which provide various services anytime and anywhere by connecting many devices and objects, are one of the major issues to be considered in the next generation communication. In addition, in next-generation communication, a communication system design considering a service/UE sensitive to reliability and latency is being discussed. The introduction of next generation RAT considering enhanced mobile broadband communication, massive MTC, ultra-reliable and low latency communication (URLLC) is discussed, and in the present invention, the technology may be called 'new RAT'.

OFDM Numerology

A New RAT system uses an OFDM transmission scheme or a similar transmission scheme thereto and representatively has OFDM numerology of Table 3 below.

TABLE 3

| Parameter | Value |
|---|---|
| Subcarrier-spacing (Δf) | 60 kHz |
| OFDM symbol length | 16.33 μs |
| Cyclic Prefix (CP) length | 1.30 μs/1.17 μs s |
| System bandwidth | 80 MHz |
| No. of available subcarriers | 1200 |
| Subframe length | 0.25 ms |
| Number of OFDM symbols per subframe | 14 symbols |

Self-Contained Subframe Structure

Figure 14:
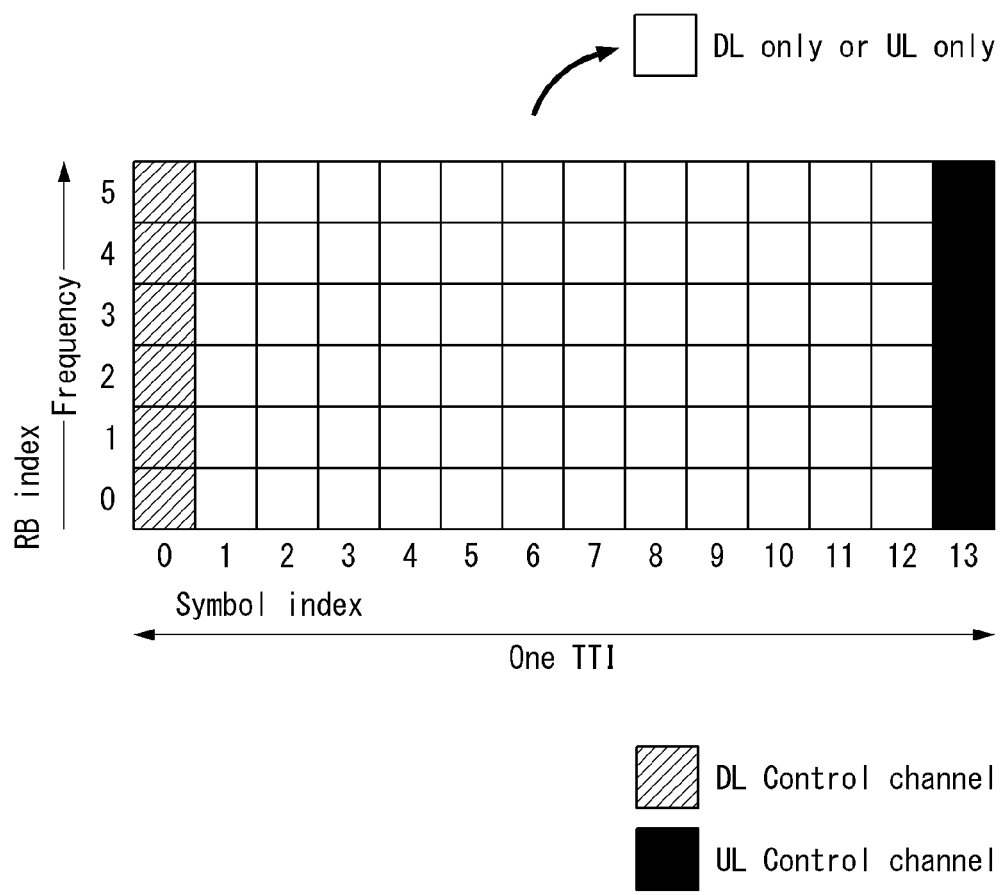
FIG. 14 illustrates a self-contained subframe structure to which the present invention is applicable.

In order to minimize the latency of data transmission in a TDD system, the fifth generation new RAT considers a self-contained subframe structure in which a control channel and a data channel are TDMed as illustrated in FIG. 14.

FIG. 14 illustrates a self-contained subframe structure to which the present invention is applicable.

In FIG. 14, a hatched area indicates a transmission area of a physical channel PDCCH for DCI delivery and a black part indicates a transmission area of the physical channel PUCCH for Uplink Control Information (UCI) delivery.

The control information delivered by the eNB to the UE via the DCI may include information on the cell configuration which the UE should know, DL specific information such as DL scheduling, and/or UL specific information such as a UL grant. Further, the control information delivered by the UE to the eNB via the UCI may include an ACK/NACK report for HARQ for DL data, CSI report for a DL channel state, and/or a scheduling request (SR).

In FIG. 14, an unmark area may be used a physical channel PDSCH transmission area for downlink data and used as a physical PUSCH transmission area for uplink data. Such a structure is characterized in that DL transmission and UL transmission are sequentially performed in one subframe (SF), and DL data is transmitted in the corresponding SF, and UL ACK/NACK may be received. As a result, according to such a structure, it takes less time to retransmit data when a data transmission error occurs, thereby minimizing the latency of final data delivery.

In such a self-contained subframe structure, there is a need for a time gap between the eNB and the UE for the conversion process from the transmission mode to the reception mode or from the reception mode to the transmission mode. To this end, some OFDM symbols at the time of switching from DL to UL in the subframe structure may be set to GP, and such a subframe type may be referred to as a 'self-contained SF'.

Analog Beamforming

In the millimeter wave (mmW), the wavelength is shortened, so that a plurality of antennas may be installed in the same area. That is, a total of 100 antenna elements can be installed in a 2-dimensional array at a 0.5 lambda (wavelength) interval on a panel of 5 by 5 cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem in that effectiveness is deteriorated in terms of costs. Therefore, a method of mapping a plurality of antenna elements to one TXRU and adjusting a direction of a beam using an analog phase shifter is considered. Such an analog beamforming method has a disadvantage in that frequency selective beamforming cannot be performed by making only one beam direction in all bands.

A hybrid BF with B TXRUs, which is an intermediate form of digital BF and analog BF, and fewer than Q antenna elements, may be considered. In this case, although there is a difference depending on a connection method of B TXRUs and Q antenna elements, the number of directions of the beams that can be transmitted at the same time is limited to B or less.

Further, in a New RAT system, when multiple antennas are used, a hybrid beamforming technique combining digital beamforming and analog beamforming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRUs) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 15:
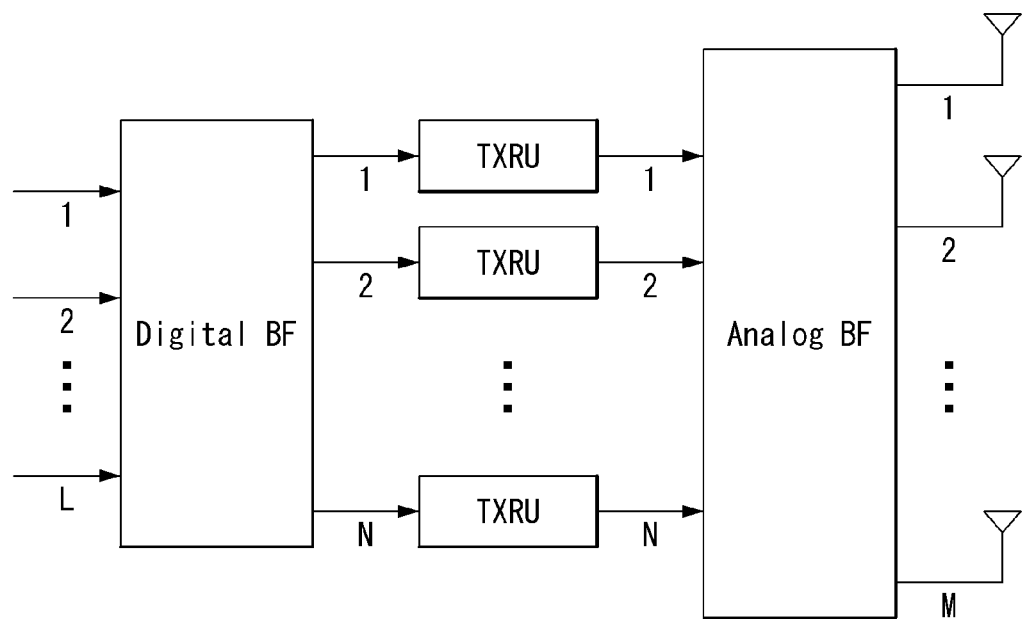
FIG. 15 is a diagram illustrating a hybrid beamforming structure in terms of a transceiver unit (TXRU) and a physical antenna.

FIG. 15 is a diagram illustrating a hybrid beamforming structure in terms of a transceiver unit (TXRU) and a physical antenna. In FIG. 15, a case where the number of digital beams is L and the number of analog beams is N is illustrated.

In the New RAT system, considered is a direction in which the eNB is designed to change the analog beamforming by the unit of the symbol to support more efficient beamforming to a UE positioned in a specific region. Furthermore, in FIG. 15, when N specific TXRUs and M specific RF antennas are defined as one antenna panel, a scheme that introduces a plurality of antenna panels capable of applying independent hybrid beamforming is also considered in the New RAT system.

When the eNB uses a plurality of analog beams, analog beams favorable for signal reception may different each UE, and as a result, a beam sweeping operation is considered, which allows all UEs to have a reception opportunity by changing a plurality of analog beams which the eNB is to apply for each symbol in a specific subframe (SF) at least with respect to a synchronization signal, system information, paging, etc.

Figure 16:
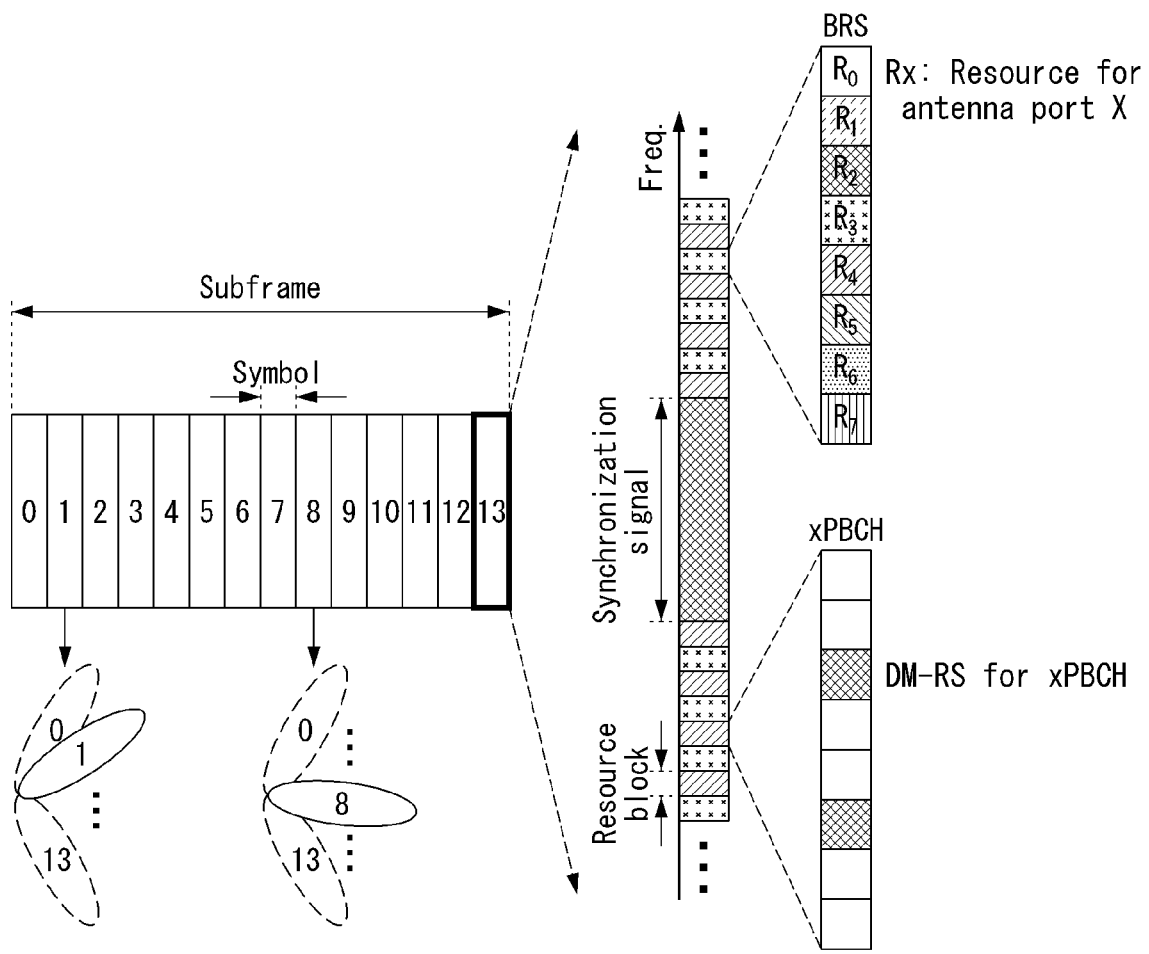
FIG. 16 illustrates an example of a beam sweeping operation for a synchronization signal and system information in a DL transmission process.

FIG. 16 illustrates an example of a beam sweeping operation for a synchronization signal and system information in a DL transmission process.

In FIG. 16, a physical resource (or physical channel) through which the system information of the New RAT system is transmitted in a broadcasting scheme is referred to as physical broadcast channel (xPBCH).

Referring to FIG. 16, analog beams which belong to different antenna panels may be simultaneously transmitted in one symbol. In order to measure the channel for each analog beam, a method is discussed, which introduces a beam RS (BRS) in which a single analog beam (corresponding to a specific antenna panel) is applied and transmitted as illustrated in FIG. 16. The BRS may be defined for a plurality of antenna ports and each antenna port of the BRS may correspond to the single analog beam. In this case, unlike the BRS, the synchronization signal or xPBCH may be transmitted, to which all of the analog beams in the analog beam group are applied so as to be well received by random UEs.

RPM Measurement in LTE

The LTE system supports RRM operations for power control, scheduling, cell search, cell reselection, handover, radio link or connection monitoring, connection establishment/re-establishment, etc. The serving cell may request RRM measurement information, which is a measurement value for performing the RRM operations, to the UE. Representatively, in the LTE system, the UE may measure/acquire information including cell search information for each cell, reference signal received power (RSRP), reference signal received quality (RSRQ), and the like and report the measured information to the eNB. Specifically, in the LTE system, the UE receives 'measConfig' as a higher layer signal for RRM measurement from the serving cell. The UE may measure RSRP or RSRQ according to information of the 'measConfig'. Here, the definition of the RSRP, the RSRQ, and the RSSI according to TS 36.214 document of the LTE system is as follows.

[RSRP]

The reference signal received power (RSRP) is defined as a linear average in power contributions (in [W]) of a resource element carrying a cell-specific RS (CRS) within a considered measurement frequency bandwidth. For RSRP determination the cell-specific reference signals R0 according TS 36.211 [3] shall be used. When the UE may reliably detect that R1 is available, the UE may determine the RSRP by using R1 in addition to R0.

The reference point for the RSRP shall be the antenna connector of the UE.

When receiver diversity is used by the UE, a reported value need not be smaller than the RSRP corresponding to a random individual diversity branch.

[RSRQ]

The reference signal received quality (RSRQ) is defined as a ratio N x RSRP/(E-UTRA carrier RSSI) (i.e., E-UTRA carrier RSSI to N x RSRP) and N represents the number of RBs of an E-UTRA carrier RSSI measurement bandwidth. The measurements in the numerator and denominator shall be made over the same set of resource blocks.

An E-UTRA Carrier Received Signal Strength Indicator (RSSI) may include the linear average of the total received power (in [W]) observed/measured by the UE only in OFDM symbols containing reference symbols for antenna port 0, in the measurement bandwidth, over N number of resource blocks from all sources, including co-channel serving and non-serving cells, channel interference, thermal noise etc. When the higher layer signaling represents a specific subframe for performing the RSRQ measurement, the RSSI may be measured for all OFDM symbols in the indicated subframe.

The reference point for the RSRP shall be the antenna connector of the UE.

When receiver diversity is used by the UE, a reported value need not be smaller than the RSRQ corresponding to a random individual diversity branch.

[RSSI]

The RSSI may correspond to received broadband power including thermal noise and noise generated at the receiver within a bandwidth defined by a receiver pulse shaping filter.

The reference point for measuring the RSSI should be the antenna connector of the UE.

When receiver diversity is used by the UE, a reported value need not be smaller than the UTRA carrier RSSI corresponding to a random individual receiving antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in system information block type 5 (SIB5) in the case of inter-frequency measurement. Alternatively, in the absence of such an IE, the UE may perform measurement in a frequency band of the entire downlink (DL) system by default. In this case, when the UE receives an allowed measurement bandwidth, the UE may consider the corresponding value as a maximum measurement bandwidth and arbitrarily measure the value of the RSRP within the corresponding bandwidth/value. However, when the serving cell transmits an IE defined as wideband (WB)-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

CSI Reporting/Feedback Method of UE

In order to generate a beam suitable for reception, the transmitter shall be able to determine the information on the channel and accurately measure the appropriate beam and a gain when using the beam. The channel information may be measured in such a manner that the receiver transmits a separate pilot signal to the transmitter, but the current mobile communication system is configured in such a manner that the receiver measures the channel and then, provide the measured channel to the transmitter in the form of the CSI.

In the MIMO implementation, the channel may be defined as a combination of subchannels generated between a plurality of transmitting and receiving antennas, and a more complex form may be obtained as the number of antennas used in the MIMO implementation increases. According to a scheme that measures and reports the channel information, the method may be divided into 1) an implicit CSI reporting/feedback scheme (may be referred to as an implicit reporting/feedback method) and 2) an explicit CSI reporting/feedback scheme (may be abbreviated as an explicit report/feedback method).

The implicit CSI reporting scheme is a scheme of interpreting the measured channel information instead of the information of the channel measured by the receiver and selectively reporting only the contents substantially required for beam generation by the transmitter. As compared with the explicit CSI reporting scheme, the implicit CSI reporting scheme has an advantage in that signaling overhead consumed for CSI reporting is small, and as a result, the implicit CSI reporting scheme is used in a current mobile communication system. For example, implicit CSI (feedback) information may include the following information.

When the implicit CSI (feedback) information has a limited number of precoder candidates, precoder index feedback (e.g., precoding matrix index (PMI))

Channel quality information (CQI)

Rank information/indicator (RI)

A detailed description related to the implicit CSI feedback is as described above with reference to FIGS. 7 to 9 above.

The explicit CSI reporting scheme is a scheme that reports information maximally approximate to a measurement value without the process of interpreting the channel measured by the receiver. Various schemes such as quantization or singular value decomposition (SVD) operations of an MIMO channel expressed in a matrix form may be used to reduce the signaling overhead used in the CSI reporting. For example, the explicit CSI (feedback) information may include the following information.

Channel coefficient quantization & quantization index feedback;

MIMO matrix or vector quantization & quantization index feedback;

Channel covariance matrix feedback;

Eigen matrix feedback or eigen vector and eigen value of channel matrix; and/or

Channel matrix.

The explicit CSI (feedback) information may be divided for each type and reported to the eNB. For example, first type CSI (feedback) information may correspond to a channel covariance matrix and second type CSI (feedback)

information may correspond to an eigen matrix feedback, and third type CSI (feedback) information may correspond to a channel matrix.

However, such an explicit CSI feedback has a disadvantage in that the quantity of channel information/coefficients which the UE shall feed back increases. Therefore, this specification intends to propose an efficient scheme for reducing the signaling overhead when performing the explicit CSI feedback. Prior to describing the scheme, CSI information/coefficients/parameters explicitly fed back will be first described.

A spatial channel matrix (or also referred to as the channel matrix) which may be used for generating the codebook may be expressed as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$ [Equation 16]

Where H(i,k) represents a spatial channel matrix, Nr represents the number of receiving antennas, Nt represents the number of transmitting antennas, r represents an index of the receiving antenna, t represents an index of the transmitting antenna, i represents an index of an OFDM (or SC-FDMA) symbol, and k represents an index of the subcarrier.

$h_{r,t}$ (i, k) as elements of channel matrix means an r-th channel state and a t-th antenna on an i-th symbol and a k-th subcarrier.

Further, a spatial channel covariance matrix which may be used in the present invention is described in brief. The spatial channel covariance matrix may be represented by a symbol R as shown in Equation 17 below.

$$R = E[H_{i,k}^H H_{i,k}]$$ [Equation 17]

Where H represents the spatial channel matrix, R represents the spatial channel covariance matrix, and (H)^H represents the hermitian matrix of H. E[ ] represents a mean, i represents the symbol index, and k represents a frequency index.

Singular value decomposition (SVD) is a technique as one of important methods for decomposing a rectangular matrix which is used as a signal processing and statistics field. The singular value decomposition (SVD) which normalizes a spectrum theory for a random rectangular matrix may decompose an orthogonal square matrix into a diagonal matrix by using the eigen value as a basis by using the spectrum theory. It is assumed that the channel matrix H is an m×n matrix constituted by a set of real or complex numbers. In this case, the matrix H may be represented by a product of three matrixes as shown in Equation 18 below.

$$H_{m \times n} = U_{m \times m} \Sigma_{m \times n} V_{n \times n}^H$$ [Equation 18]

Where U and V represent unitary matrixes and Σ represents an m×n diagonal matrix including not a negative value but a singular value. The singular value is $\Sigma = \text{diag}(\sigma_1 \ldots \sigma_r)$, $\sigma_i = \sqrt{\lambda_i}$. As described above, the product of three matrixes is called the singular value decomposition. The singular value decomposition may handle a more normal matrix than eigen value decomposition capable of decomposing only the orthogonal square matrix. The singular value decomposition and the eigen value decomposition are associated with each other.

When the matrix H is a hermitian matrix with a positive sign, all eigen values of H are non-negative real numbers. In this case, a singular value and a singular vector of H and all eigen values of H are the non-negative real numbers. The singular value and the singular vector of H are equal to the eigen value and the eigen vector of H. Meanwhile, eigen value decomposition (EVD) may be represented as follows.

$$HH^H = (U\Sigma V^H)(U\Sigma V^H)^H = U\Sigma \Sigma^T U^H$$

$$H^H H = (U\Sigma V^H)^H (U\Sigma V^H) = V\Sigma^T \Sigma V$$ [Equation 19]

Here, the eigen value may become λ1, . . . , λr. Information on U between U and V indicating a direction of the channel may be known through singular value decomposition of HH^H and information on V may be known through singular value decomposition of H^H H. In general, in order to achieve a higher transmission rate in multi user-MIMO (MU-MIMO), beamforming is performed by each of the transmitter/receiver and when a receiver beam and a transmitter beam are represented through matrixes T and W, respectively, a channel to which the beamforming is applied is expressed as THW=TU(Σ)VW. Therefore, in order to achieve a high transmission rate, it is preferable that a received beam is generated based on U and a transmitted beam is generated based on V.

In general, an interest in designing the codebook has a problem in accurately quantizing the channel so as to reduce feedback overhead using as few bits as possible and to achieve a sufficient beamforming gain. In one scheme of codebook design schemes proposed in a recent communication standard such as 3rd Generation Partnership Project long term Evolution (3GPP LTE), LTE-Advanced, and IEEE 16m systems as an example of the mobile communication system or adopted as a standard, the codebook is transformed by using the covariance matrix of the channel as shown in Equation 20 below.

$$W' = \text{norm}(RW)$$ [Equation 20]

Where W represents an orthogonal basis matrix made to reflect the channel information or the existing codebook matrix, R represents the covariance matrix of the channel matrix H, norm(A) represents a matrix in which norm is normalized to 1 for each column of the matrix A, W' represents is a final codebook acquired by converting the existing codebook W by using the channel matrix H, the covariance matrix R of the channel matrix H, and a norm function. Further, the covariance matrix R of the channel matrix H may be represented as shown in Equation 21 below.

$$R = E[H^H H] = V \Lambda V^H = \sum_{i=1}^{Nt} \sigma_i v_i v_i^H$$ [Equation 21]

Where the covariance matrix R of the channel matrix H is decomposed to $V \Lambda V^H$ by the singular value decomposition and V represents an Nt x Nt unitary matrix and has $V_i$ as an ith column vector. Λ represents a diagonal matrix having $\sigma_i$ as an ith diagonal component and $V^H$ represents the hermitian matrix of V. In addition, $\sigma_i$ and $V_i$ represent an ith singular value and an ith singular column vector corresponding thereto, respectively ($\sigma_1 \geq \sigma_2 \geq \ldots \geq \sigma_{Nt}$).

The covariance matrix R may be calculated and reported during a long term, for example, but is not limited thereto.

As described above, the explicit CSI reporting scheme is a scheme that reports the CSI by quantizing the channel information with a high resolution. In the explicit CSI reporting scheme, as explicit CSI reported to the eNB by the UE, three types may generally exist as below.

First type: channel covariance ($H^H H \in C^{N_T \times N_T}$)

Second type: Dominant Eigenvector/Matrix ($U_k \in C^{N_T \times k}$) where $H^H H = U \Sigma U^H$, $\Sigma = \text{diag}[\sigma_1^2, \sigma_2^2, \ldots \sigma_{N_T}^2]$, $\sigma_1^2 \geq \sigma_2^2 \ldots \geq \sigma_{N_T}^2$, $U = [u_1, u_2, \ldots, u_{N_T}]$ and $U_k = [u_1, u_2, \ldots, u_k]$ Third type: channel matrix ($H \in C^{N_R \times N_T}$)

In each type, N_T represents the number of transmitting antenna ports, N_R represents the number of receiving antenna ports, k represents the number of dominant eigen vectors, and U represents an N_T×N_T unitary matrix (or receiving beamforming vector). Besides, the CSI for each type is described above in detail and in particular, a second type unitary matrix U may correspond to the unitary matrix V described above.

In all of three types described above, the quantity of channel coefficients which the UE shall feed back increases according to the number of transmitting antenna ports.

For example, in the case of a first type, complex value feedbacks are required as many as N_T×N_T and even though a hermitian symmetry is considered, complex value feedbacks are required as many as $$\frac{N_T^2 + N_T}{2}.$$

Accordingly, this specification proposes various embodiments that may efficiently reduce a dimension of the channel information in order to reduce the feedback signaling overhead and the quantity of feedback channel coefficients.

1. First Embodiment: Method for Transmitting CSI by Projecting CSI to Orthogonal Basis (Orthogonal Beam Matrix (Q)

As the first embodiment, a method for reducing a feedback amount by projecting the CSI to a specific orthogonal basis (orthogonal beam matrix, Q) and transmitting the CSI is proposed. That is, the first embodiment aims at, by using a matrix constituted by vectors (in this case, the length of the vector is N_T or N_T/2) of a smaller number (m where N_T>m) than a dimension (N_T) of all matrixes (in the above example, N_T×N_T channel covariance matrixes or N_T×k dominant eigen matrixes/vectors) to be transmitted by the UE, re-expressing the matrix (e.g., the channel covariance matrix or dominant eigen matrix/vector) to be reported as the CSI as a matrix with a reduced dimension by a scheme such as linear/non-linear transform such as projection/inner product and reporting the re-expressed matrix to the eNB. Hereinafter, an application method of the first embodiment for each CSI type will be described below in detail.

In the case of the first type, the UE projects the channel covariance matrix $H^H H$ to a specific orthogonal basis (orthogonal beam matrix (Q) shared with the eNB to reduce the dimension. The projection of the channel covariance matrix $H^H H$ to orthogonal beam matrix (Q) may be expressed as shown in Equation 22 below.

$$R(\in C^{m \times m}) = Q^H H^H H Q, Q = [q_1, q_2, \ldots, q_m] \in C^{N_T \times m} \quad \text{[Equation 22]}$$

In Equation 22, R represents a final matrix derived by projecting the channel covariance matrix $H^H H$ to the orthogonal basis (orthogonal beam matrix, Q) and Q represents the orthogonal basis (orthogonal beam matrix, Q) having m beams (or beam vectors (q_1, q_2, . . . , q_m) orthogonal to each other as the elements.

As shown in Equation 22, it can be seen that the dimension of the channel covariance matrix $H^H H$ is significantly reduced from N_T×N_T to m×m (N_T>m).

The UE may feed back to the eNB information on R regarding the channel covariance matrix with the reduced dimension and/or information on Q as the CSI. The m as a value smaller than N_T may be fed back together with the CSI as a value which the UE is configured from the eNB in advance or which the UE recommends to the eNB. The eNB may calculate/acquire the beamforming vector through Equation 23 below by using the CSI fed back from the UE.

$$\text{eig}(H^H H) \approx Q \cdot \text{eig}(R) \quad \text{[Equation 23]}$$

In Equation 23, eig( ) represents a function of calculating/computing the eigen vector(s) from an input matrix included in parentheses In the case of the second type, the dominant eigen vector may be projected to the orthogonal basis (orthogonal beam matrix, Q) and may be expressed as shown in Equation 24 below, which is a modified form of Equation 22.

$$R(\in C^{m \times m}) = Q^H U_k U_k^H Q, U_k = [u_1, u_2, \ldots, u_k] \in C^{N_T \times k},$$
or
$$R(\in C^{m \times m}) = Q^H U_k \Sigma_k U_k^H Q, \Sigma_k = \text{diag}[\sigma_1^2, \sigma_2^2, \ldots, \sigma_k^2] \in C^{k \times k} \quad \text{[Equation 24]}$$

In Equation 24, R represents a final matrix generated by projecting the dominant eigen matrix $U_k$ to the orthogonal basis (orthogonal beam matrix, Q) and $U_k$ represents a matrix (i.e., eigen matrix) constituted by k (a natural number smaller than N_T) dominant eigen vectors. The k value may be predetermined between the UE and the eNB, configured by the UE through the higher layer signaling, indicated to the eNB as a value recommended by the UE (additional feedback of the UE for k is required), or determined as a value tied with the RI (e.g., when the RI is 2, k=2 is determined).

The RI may be included in a separate feedback field and explicitly reported to the eNB during explicit feedback. Alternatively, the number of meaningful/dominant eigen values (i.e., an eigen value having an absolute value even larger than other eigen values) may be obtained by applying the scheme such as SVD to the explicit CSI (e.g., covariance) fed back by the eNB again and the RI may be implicitly found through the obtained number (e.g., in the case of $\sigma_1^2, \sigma_2^2 >> \sigma_3^2$, rank 2 is recognized). Alternatively, when the explicit feedback named as the second type is triggered by an aperiodic or semi-persistent report, the eNB may follow an RI value reported in a most recent periodic CSI report (e.g., new RAT (NR) type I CSI or type II CSI) procedure at the time of triggering or before the triggering. Similarly, even when the explicit feedback named as the second type is triggered by a periodic report, the eNB may follow the RI value reported in the most recent periodic CSI report (e.g., new RAT (NR) type I CSI or type II CSI) procedure before the triggering.

Even in the case of the second type, according to Equation 24, it can be seen that the dimension of the dominant eigen matrix $U_k$ is significantly reduced from N_T×k to m×m. The UE may feed back to the eNB information on R regarding the dominant eigen matrix with the reduced dimension and/or information on Q as the CSI. The m as a value which the UE is pre-configured from the eNB or which the UE recommends to the eNB may be fed back together with the CSI. The eNB may calculate/acquire the beamforming vector through Equation 23 above by using the CSI fed back from the UE.

In the case of the third type, when $H \in C^{N_R \times N_T}$ is subjected to SVD and written again, $H \in C^{N_R \times N_T}$ is expressed as where $H=V\Sigma U^H$, $\Sigma=\text{diag}[\sigma_1, \sigma_2, \ldots \sigma_{N_T}]$, $\sigma_1^2 \geq \sigma_2^2 \ldots \geq \sigma_{N_T}^2$, $V=[v_1, v_2, \ldots, V_{N_R}]$ $U=[u_1, u_2, \ldots, u_{N_T}]$
Here, V represents an N_R×N_R unitary matrix.

In this case, the reported feedback/CSI information may be a channel vector $r=v_1 H \in C^{1 \times N_T}$ which the UE derives by assuming the SU-MIMO and the eNB may use the channel vector as a rank-1 precoding vector as it is. In this case, the channel vector is calculated as $r=\sigma_1 u_1^H$ and may be similar to a case where k=1 is configured in the second type. Alternatively, when the channel vector is normalized to '1' by a norm(r)function/operation so as not to include the eigen value, the channel vector coincides with the channel vector of type 2. In the above scheme, the eNB may inform the UE of whether the channel vector is to include the eigen value at the time of deriving the channel vector through the higher layer.

In the case of the above scheme, as the rank increases, the amount of feedback increases. Therefore, a case of limiting to a specific rank (for example, rank=1) is exemplified. When the case is generalized/extended to a case of not limiting the rank, the case may be expressed as shown in Equation 25 below.

$$R=[v_1 \ldots v_m]H \in C^{m \times N_T} \quad \text{[Equation 25]}$$

In Equation 25, R represents a final channel matrix derived without limiting the rank and m represents the number of receiving antennas. m as a parameter for determining a total amount of feedback with the number of columns constituting R may be determined to match the rank reported by the UE or informed to the UE through the higher layer by the eNB.

Unlike the first and second types, the third type does not employ the scheme of projecting to the orthogonal basis (orthogonal beam matrix, Q), so that the dimension may not be greatly reduced. Thus, in the application of the third type, N_T may be limited to a specific number (e.g., N_T=2 and/or 4).

As described above, according to the first embodiment, trade-off between performance degradation due to the reduction of the dimension and the feedback overhead is apparent. In other words, when a domain of Q is extended to N_T×N_T in the first type, $\text{eig}(H^H H)=Q \cdot \text{eig}(R)$ is established, and as a result, accurate eigen beamforming may be performed, but an effect of the dimension reduction disappears.

Therefore, hereinafter, there is proposed a method (A and B) for determining/calculating an efficient orthogonal basis (orthogonal beam matrix, Q) for achieving the dimension reduction effect while minimizing the performance degradation.

A. 2 Dimension (D)-Discrete Fourier Transform (DFT) Beam Search Based Method

In Rel-13 FD-MIMO, a codebook using a 2D DFT vector (constituted by a Kronecker product between the DFT vectors of first and second domains) is introduced and is defined/expressed as shown in Equation 26.

$$w_{m_1, m_2} = \frac{v_{m_1} \otimes u_{m_2}}{\sqrt{N_1 - N_2}} \quad \text{[Equation 26]}$$

-continued
$$v_{m_1} = \left[1 \ \exp\left(j\frac{2\pi m_1}{o_1 N_1}\right) \ \ldots \ \exp\left(j\frac{2\pi m_1 (N_1-1)}{o_1 N_1}\right)\right]^T$$
$$u_{m_2} = \left[1 \ \exp\left(j\frac{2\pi m_2}{o_2 N_2}\right) \ \ldots \ \exp\left(j\frac{2\pi m_2 (N_2-1)}{o_2 N_2}\right)\right]^T$$

In Equation 26, N1 and N2 represent the numbers of antenna ports per polarization in the first and second dimensions, respectively. O1 and O2 represent oversampling factors at the first and second dimensions, respectively. In addition, m_1 and m_2 represent selection methods (or beam indexes) of Discrete Fourier Transform (DFT) vectors in horizontal and vertical domains (or first and second domains), respectively. A specific 2D beam group may be configured through m_1 and m_2.

In Equation 26, w may be derived by considering only one polarization/pol of cross (X)-pol (cross polarization) and applied to co-pol (the other polarization/pol) in the same manner.

In the case of the 2D-DFT vector, there may be orthogonal beam sets constituted by N_T=N1*N2 beams based on one beam (e.g., a leading beam located at (m1, m2)=(0, 0)). Orthogonality is satisfied between a plurality of beams divided/defined into one orthogonal beam set. Best m beams (<N1*N2) that constitute the efficient orthogonal basis (orthogonal beam matrix, Q) in the orthogonal beam set constituted by N1*N2 orthogonal beams may be selected. An example thereof will be described below with reference to FIG. 17.

Figure 17:
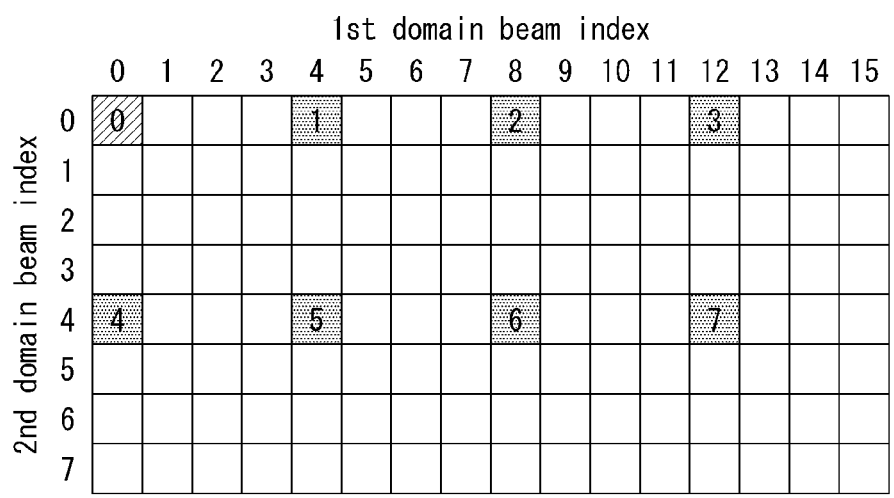
FIG. 17 illustrates an orthogonal beam set in the case of (N1,N2)=(4,2), (O1,O2)=(4,4) according to an embodiment of the present invention.

FIG. 17 illustrates an orthogonal beam set in the case of (N1,N2)=(4,2), and (O1,O2)=(4,4) according to an embodiment of the present invention.

Referring to FIG. 17, 7 orthogonal beams (q0, q1, . . . q7) determined for a reference beam (m1,m2)=(0,0) (according to ((N1,N2)=(4,2), (O1,O2)=(4,4)) may be determined and a final orthogonal beam set (Q=[q0, q1, . . . q7]) including the reference beam and 7 determined orthogonal beams may be configured. In this case, m best beams satisfying at least one of conditions i) to iii) below in the corresponding orthogonal beam set may be selected as the beams constituting the orthogonal basis (orthogonal beam matrix, Q).

i) Threshold based: As shown in Equation 27, when a size (or determinant) $(|q_i^H H^H H q_i|)$ when the channel covariance (or dominant eigen matrix) among the orthogonal beams in the orthogonal beam set is projected to a specific orthogonal beam (q_i) matrix exceeds a threshold which the UE and the eNB predetermine or a threshold indicated through a radio resource control (RRC) signaling, the orthogonal basis (orthogonal beam matrix, Q) may be constituted by corresponding orthogonal beams (q_i) as the elements. In other words, the orthogonal basis (orthogonal beam matrix, Q) may be configured, which has specific orthogonal beams satisfying Equation 27 as the elements.

$$q_i \in Q, \text{ if } |q_i^H H^H H q_i| > \text{Threshold} \quad \text{[Equation 27]}$$

In Equation 27, q_i may correspond to a matrix of i-th orthogonal beams included in the orthogonal beam set and (q_i)^H may correspond to a hermetian matrix of q_i. The q_i may be derived/computed based on Equation 26.

ii) When it is assumed that the number of dominant eigen vectors is k, k orthogonal beams (q_i) are selected in an order in which the value of $|q_i^H H^H H q_i|$ is larger to configure/constitute the orthogonal basis (orthogonal beam matrix, Q).

iii) The metric of the i) and ii) schemes (i.e., a selection/determination criterion of the orthogonal beams (q_i) constituting the orthogcnal basis (orthogonal beam matrix, Q))

may be replaced with a signal-to-interference-plus-noise ratio (SINR) or a correlation value with the dominant eigen vector when a specific 2D DFT beam is used.

In the embodiment, the reference beam (m1,m2) may also be selected/determined using the metric proposed in i), ii) and/or iii) described above. More specifically, a beam having a maximum value when calculating the metric proposed in the above embodiment among the beams satisfying ($m_1$, $m_2$) where ($m_1 \leq O_1-1$, $m_2 \leq O_2-1$) may be selected/determined as the reference beam (m1,m2). For example, a beam having a maximum value $|q_i^H H^H H q_i|$ among the beams at positions satisfying ($m_1$,$m_2$) where ($m_1 \leq O_1-1$, $m_2 \leq O_2-1$) may be selected/determined as the reference beam.

Alternatively, the condition under which the reference beam is selected may be normalized and expressed as shown in Equation 28.

$$(m_1,m_2) \text{ where } (O_1*n_1 \leq m_1 \leq O_1*(n_1-1)+O_1-1,$$
$$O_2*n_2 \leq m_2 \leq O_2*(n_2-1)+O_2-1), n_1=0,1,\ldots N_1-1,$$
$$n_2=0,1,\ldots N_2-1 \qquad \text{[Equation 28]}$$

In Equation 28, n1 and n2 represent beam group indexes constituted by O1*O2 beam groups and for example, when n1=2 and n2=1, n1 and n2 may correspond to groups constituted by beams of which first domain beam indexes are 8 to 11 and second domain beam indexes are 4 to 7.

After selecting the best/preferred beam using/based on the metric proposed in i) to iii), the beam group index (n1,n2) to which the beam selected according to Equation 28 belongs is determined to determine the reference beam (m1,m2).

B. 2D-DFT Codebook Based (Rel-13 and/or Rel-14 FD-MIMO)

In the case of scheme A proposed above, as the UE shall report respective beams constituting the orthogonal basis (orthogonal beam matrix, Q), the feedback amount may significantly increase. Accordingly, in order to solve the problem, proposed is a scheme of determining/reporting the orthogonal basis (orthogonal beam matrix, Q) using Class A codebook of extension (depending on N1, N2, O1, O2, and/or Codebook Config) of Class A codebook of LTE-A FD-MIMO in scheme B.

Class A codebook as a dual stage codebook is configured as shown in Equation 29.

$$w = w_1 w_2 = \begin{bmatrix} \overline{w}_1 & 0 \\ 0 & \overline{w}_1 \end{bmatrix} w_2 \qquad \text{[Equation 29]}$$

In Equation 29, W1 represents a characteristic of long-term/wideband, and W2 represents a characteristic of short-term/subband. Further, W1 is used for beam grouping ($\overline{W}_1$) and W2 is used for beam selection and co-phase.

One of the characteristics of Class A codebook is that the number of orthogonal beams in the W1 beam group is determined for each rank.

More specifically,

1) In case of Codebook Config 2-4:

$\overline{W}_1$ includes 4 beams not orthogonal to each other in the case of rank 1-2, 4 orthogonal beam pairs in the case of rank 3-4, 3 orthogonal beams in the case of rank 5-6, and 4 orthogonal beams in the case of rank 7-8, respectively.

2) In case of Codebook Config 1:

$\overline{W}_1$ includes 1 beam in the case of rank 1-2, 2 orthogonal beams in the case of rank 3-4, 3 orthogonal beams in the case of rank 5-6, and 4 orthogonal beams in the case of rank 7-8, respectively.

The orthogonal basis (orthogonal beam matrix, Q) may be configured/determined using/based on W1 and/or Codebook Cofig of the dual stage codebook. In this way, when the UE reports the orthogonal basis (orthogonal beam matrix, Q) to the eNB, the UE may report only W1 and/or RI without the need for reporting the beams constituting the orthogonal basis (orthogonal beam matrix, Q) to the eNB like scheme A, and as a result, a burden of the UE and the signaling overhead are reduced.

Figure 18:
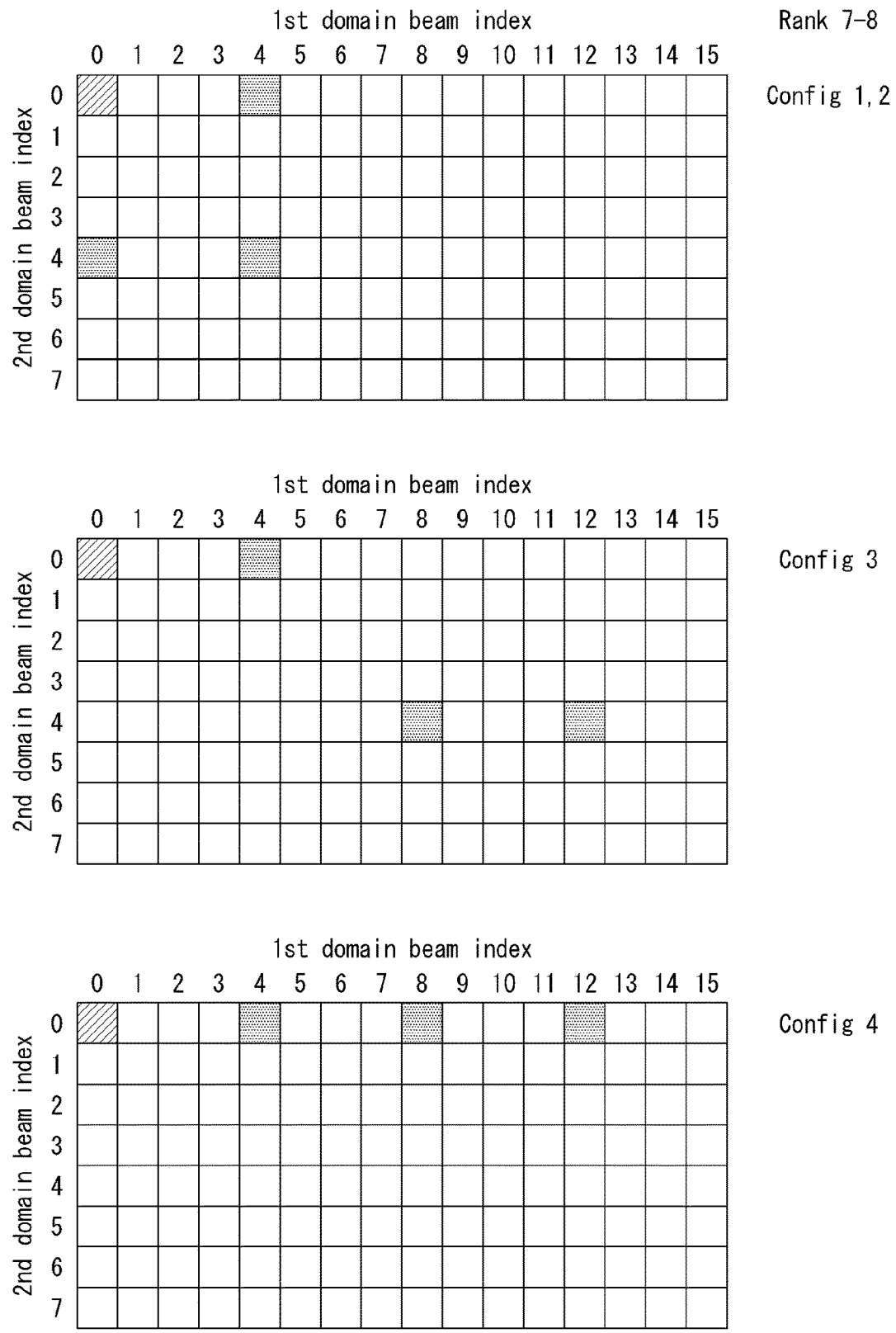
FIG. 18 illustrates an orthogonal beam set for each Codebook Cofig (or orthogonal basis (orthogonal beam matrix, Q)) in the case of (N1,N2)=(4,2), (o1,o2)=(4,4) and Rank 7-8 according to an embodiment of the present invention.

FIG. 18 illustrates an orthogonal beam set for each Codebook Cofig (orthogonal basis (orthogonal beam matrix, Q)) in the case of (N1,N2)=(4,2), (o1,o2)=(4,4) and Rank 7-8 according to an embodiment of the present invention.

In the drawing, the reference beam may be determined according to a W1 index calculated based on Class A codebook and separately reported or determined according to schemes i) to iii) described above. In the drawing, for convenience of description, the reference beam is described based on the case where (m1,m2)=(0,0).

In the case of Codebook Config 1, since the orthogonal beam is determined according to the rank, the UE additionally reports 2-bit RI (e.g., in the case of rank=1 to 2, RI='0', in the case of rank=3 to 4, RI='1', in the case of rank=5 to 6, RI='2', and in the case of rank=7 to 8, RI='3') together with the index of W1 to indicate the orthogonal basis (orthogonal beam matrix, Q) to the eNB.

In the case of a UE which is configured as Codebook Config 2, 3, or 4, when rank=1 to 4, since non-orthogonal beams are mixed, the UE may report the orthogonal basis (orthogonal beam matrix, Q) by assuming Codebook Config 1. Alternatively, as illustrated in FIG. 19 to be described below, the UE may additionally inform which beam among four beams (of Codebook Config 2, 3, or 4) determines the orthogonal basis (orthogonal beam matrix, Q) by using a 2-bit indicator in addition to the W1 index.

FIG. 19 illustrates a beam pattern in the case of (N1,N2)=(4,2), (o1,o2)=(4,4), Rank 3-4, (m1,m2)=(0,0), and Codebook Config=2 according to an embodiment of the present invention.

Referring to FIG. 19, the UE may additionally report to the eNB which beam of {0, 1, 2, 3} in two beam sets divided by the same pattern is selected. For example, when the UE reports beam #1 as an optimal beam pair, the orthogonal basis (orthogonal beam matrix, Q) may be configured by using beam #1 (i.e., two beams #1 located at (m1,m2)=(1,0) and (5,0)) in each beam set.

And/or, since the orthogonal basis (orthogonal beam matrix, Q) is different according to codebook Config, the UE may calculate the metric (i) to iii) of scheme A are applicable) of the orthogonal basis (orthogonal beam matrix, Q) for each of all Codebook Configs and report a Codebook Config index corresponding to the best orthogonal basis (orthogonal beam matrix, Q), the 2-bit RI, and the W1 index.

Up to now, when the orthogonal basis (orthogonal beam matrix, Q) is configured, only one polarization is considered in the X-pol antenna port. That is, a case where a basis configured by the same DFT beam per each polarization is used is described and the orthogonal beams constituting the orthogonal basis in this case may be expressed by two same DFT beams as shown in Equation 30 and this means that the same beam is applied per each polarization.

$$w_{m_1,m_2,n_1,n_2} = \frac{1}{\sqrt{2N_1N_2}} \begin{bmatrix} v_{m_1} \otimes u_{m_2} \\ v_{m_1} \otimes u_{m_2} \end{bmatrix} \qquad \text{[Equation 30]}$$

The 2D-DFT beam in a case of considering even opposite polarization of the X-pol antenna using an advantage of a structure of the X-pol antenna may be expressed/configured as shown in Equation 31. That is, in Equation 31, DFT beams of different polarization antennas are different from each other (in terms of a phase and/or an amplitude) and in this case, the orthogonal basis may be configured by using the same set as Equation 31 and expressed/configured as shown in Equation 32.

$$w_{m_1,m_2,n_1,n_2} = \frac{1}{\sqrt{2N_1N_2}} \begin{bmatrix} v_{m_1} \otimes u_{m_2} \\ \alpha_{n_1} \phi_{n_2} v_{m_1} \otimes u_{m_2} \end{bmatrix} \quad \text{[Equation 31]}$$

$$w_{m_1,m_2,m_3,m_4,n_1} = \frac{1}{\sqrt{2N_1N_2}} \begin{bmatrix} v_{m_1} \otimes u_{m_2} \\ \alpha_{n_1} v_{m_3} \otimes u_{m_4} \end{bmatrix} \quad \text{[Equation 32]}$$

In Equations 31 and 32, $\alpha_{n_1}$ as a coefficient of adjusting the amplitude of the opposite polarization may have a value such as {0.25, 0.5, 0.75, 1} which are uniformly quantized, for example and $\phi_{n_2}$ as a coefficient for matching a co-phase component may have a value of {1, −1, j, −j}, for example.

For performance enhancement of the explicit CSI feedback, the amplitude and phase information may be fed back together with the orthogonal basis (orthogonal beam matrix, Q) determined according to the proposed method. Alternatively, in order to reduce a feedback payload size, only any one of the amplitude and the phase may be reported. Alternatively, according to a channel environment of the UE, the UE may determine whether to feed back the amplitude and the phase and report whether to feed back the amplitude and the phase to the eNB. For example, since the necessity of amplitude feedback is not large in an environment in which line-of-sight (LOS) is dominant, the UE may report only the phase information. In this case, feedback of an additional 1-bit indicator for distinguishing whether the UE 'reports only the phase' or 'reports the phase and the amplitude' may be required.

As another scheme, the orthogonal basis (orthogonal beam matrix, Q) may be constituted by N_T 1D/2D DFT beams or a specific orthogonal basis (orthogonal beam matrix, Q) regardless of an antenna structure. When 1D DFT is applied, the orthogonal basis (orthogonal beam matrix, Q) may be configured by calculating a 1D DFT vector by configuring/assuming an oversampling factor as O1*O2 with N_T=N1*N2*2. When 2D DFT is applied, the orthogonal basis (orthogonal beam matrix, Q) may be configured by calculating a 2D DFT vector by configuring/assuming (N1, N2'=N2*2) by doubling a size of a specific domain (may be configured)—for example, a second domain.

Alternatively, the orthogonal basis (orthogonal beam matrix, Q) may be constructed/configured independently for each polarization. In this case, it may be appreciated that CSI of first to third types which are finally reported is independently reported/fed back for each polarization. Alternatively, the CSI of the first to third types may be independently reported/fed back for each specific antenna port group and such a scheme may be used for non-coherent transmission. In this case, the RI may be determined/configured as the sum of ranks for each port group and further, independent wideband (WB) and/or subband (SB) CQI may be reported for each antenna port group.

Hereinabove, a method for configuring the orthogonal basis (orthogonal beam matrix, Q) using a DFT matrix is described, but the present invention is not limited thereto and a specific orthogonal basis (orthogonal beam matrix, Q) (e.g., an orthogonal basis using Grassmannian line packing) which the eNB and the UE predetermine may be used.

In the case of R corresponding to the orthogonal basis (orthogonal beam matrix, Q), the UE may divide each of all complex elements (i.e., m^2 or when R is the hermitian matrix, (m^2+m)/2 elements) constituting each matrix into an imaginary part and a real part and independently quantize and report the imaginary part and the real part, or convert the imaginary part and the real part into the amplitude and the phase using a 2D-cylindrical coordinate (i.e., representing the complex elements by r (amplitude) and θ (phase) based on $x=x_r+jx_i=r\exp(\theta)$). In this case, quantization granularities of the amplitude and the phase may be predetermined or preconfigured as a specific value between the UE and the eNB and the quantization granularity between the amplitude and the phase may be set to different values.

And/or, a purpose of introducing the explicit CSI feedback is to enhance MU-MIMO performance by reporting more accurate channel information to the eNB as described above. For performance enhancement of MU-MIMO, when the eNB performs MU scheduling, the number of UEs oriented in the same direction needs to be large. Accordingly, the UE may report multiple orthogonal bases (orthogonal beam matrix, Q) and/or values of R corresponding thereto (simultaneously/at once). In particular, in the case of the second type, by considering individual reporting for each layer, m best eigen vectors may be reported through separate signaling, respectively. However, since reporting multiple Rs is large in terms of feedback overhead, an R_best value corresponding to a best Q value Q_best among reported multiple Qs, Ri corresponding to remaining Qi, and a differential value from the R_best may be reported (i.e., the UE reports R_best and a differential value between the R_best and the remaining Ri). In this case, as the differential value, a value calculated according to '$\|R\_best-Ri\|_F$ (here, '$\|\ \|_F$' represents Frobenius norm)', a differential value between singular values of R_best and Ri, or an SNR difference when Q and R are used may be reported.

2. Measurement and Reporting Operations of Orthogonal Basis (Orthogonal Beam Matrix, Q)

In application of schemes A and B described above, measurement and reporting of Q may be performed as follows.

The UE may measure/report orthogonal basis Q by the same measurement unit as the implicit CSI reporting/feedback (e.g., subband and/or wideband of LTE). And/or, the explicit CSI feedback scheme requiring large feedback overhead may be limited to wideband/long-term CSI reporting. And/or, Q which is the orthogonal basis (orthogonal beam matrix, Q) is reported by the unit of the subband and R may be configured to be reported by the unit of the wideband.

In the case of a communication environment to which hybrid CSI reporting/feedback in which the explicit CSI reporting/feedback and the implicit CSI reporting/feedback proposed by this specification are combined is applied, reporting Q and/or R may be configured as feedback/reporting of a relatively long period using the PUCCH through separate RRC apart from the implicit CSI reporting/feedback and the corresponding feedback/reporting may be continuously calculated as a CSI-RS estimate cumulative value in a measurement restriction (MR) off state. And/or since the explicit CSI reporting/feedback proposed by this specification has a large payload, it may be limited that the explicit CSI reporting/feedback is performed as PUSCH-based reporting/feedback.

Since the explicit CSI reporting/feedback proposed by this specification aims at sending and receiving explicit information of the channel, the UE may predetermine not to report the RI and the CQI with the eNB or calculate the RI and the CQI based on the PMI calculated assuming/based on a precoder (e.g., Type II CSI) with best performance or predetermined default precoder (for WB and/or SB) and report the calculated RI and CQI to the eNB.

3. Second Embodiment: Dimension Reduction Based Dominant Eigen Vector

The second embodiment is a scheme of quantizing the dominant eigen vector and reporting/feeding back the quantized dominant eigen vector to the eNB and according to the embodiment, there may be a gain in terms of the payload size compared with the first embodiment according to the number of dominant eigen vectors. For example, in the case of rank 1 reporting, the payload size gain is larger in the second embodiment than in the first embodiment. Further, for calculating the CQI of the eNB, the UE may additionally report the CQI value and/or a value (e.g., SINR value) corresponding thereto to the eNB.

In order to more efficiently perform eigen vector quantization, the explicit reporting/feedback and the implicit reporting/feedback may be divided from each other and used according to the domain. For example, in the case of a PMI of a vertical domain, codebook based implicit feedback may be used and in the case of a PMI of a horizontal domain, codebook based explicit feedback may be used. That is, the hybrid CSI reporting/feedback scheme in which different CSI reporting/feedback schemes are applied for each domain may be used.

Figure 20:
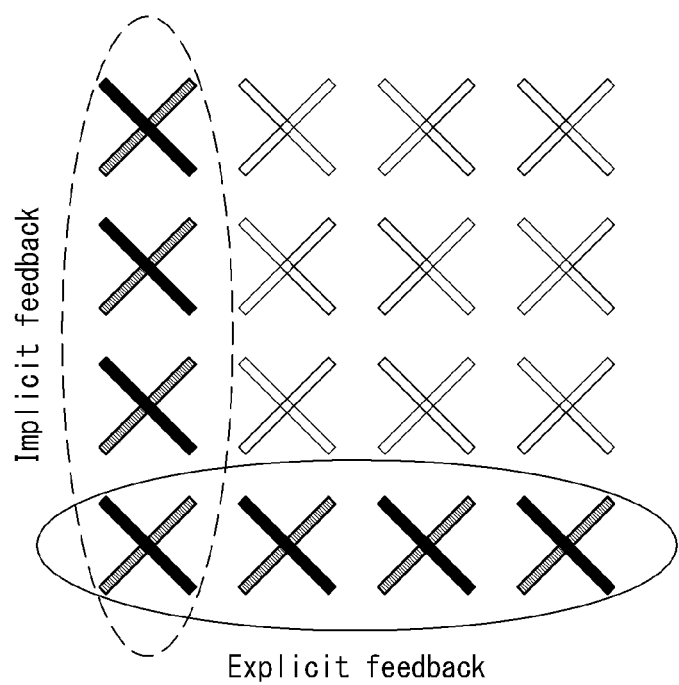
FIG. 20 is a diagram illustrating a PMI configuring method for an antenna port layout in which (N1,N2)=(4,4) according to an embodiment of the present invention.

FIG. 20 is a diagram illustrating a PMI configuring method for an antenna port layout in which (N1,N2)=(4,4) according to an embodiment of the present invention.

Referring to FIG. 20, the UE may quantize and report the eigen vector for the channel between antenna ports (antenna ports included in a solid circle in the drawing) of a first domain (e.g., the horizontal domain or the vertical domain) and the receiver (i.e., perform the explicit CSI reporting/feedback for the first domain). Further, the UE may report an LTE and/or LTE-A Class A codebook based PMI for the channel between antenna ports (antenna ports included in a dotted circle in the drawing) of a second domain (e.g., the vertical domain or the horizontal domain) and the receiver. Then, the eNB may restore all MIMO channels by performing a Kronecker product between two channel vectors received from the UE in different feedback/reporting schemes.

In the drawing, the second type eigen vector is exemplified as the explicit CSI for the first domain, but the present invention is not limited thereto and the first and third types of channel covariance and channel matrixes may be reported. Even in this case, the eNB may restore the channel by computing the explicit CSI received for the first domain together with the implicit CSI for the second domain. Hereinafter, for convenience of description, the embodiment is described based on the explicit CSI (dominant eigen vector) of the second type, but the following embodiments are equally applicable to the first and third types of explicit CSI.

In the case of the embodiment, in order to eliminate the ambiguity for rank information, the UE may report the RI by assuming Rank 1 restriction or limiting the number of dominant eigen vectors of the channel performing the explicit feedback to the number of ranks and calculate the CQI based on the corresponding RI and report the calculated CQI. Alternatively, the UE may calculate the RI by considering a relationship (i.e., Max(V-rank, H-rank)<=rank <=V-rank*H-rank, here, V and H may mean the vertical domain and the horizontal domain, respectively and correspond to explicit CSI and implicit CSI (or vice versa), respectively or correspond to a combination thereof) between the number of dominant eigen vectors of the channel performing the explicit feedback and the rank of the implicit feedback, and calculate the CQI based on the RI and report final RI and CQI.

As yet another embodiment, the explicit CSI reporting/feedback may be performed with respect to both two domains and the eNB may restore all MIMO channels by performing the Kronecker product for two eigen vectors which are reported/fed back. In order to reduce the feedback overhead of the embodiment, an eigen vector quantization level of each domain may be differently configured. For example, when 10-bit quantization is performed for channel coefficients of the eigen vector of the horizontal vector, 6-bit quantization may be performed for channel coefficients of the eigen vector of the vertical domain. The UE may additionally report to the eNB information on the quantization level of each domain or the eNB may inform the UE of the information with the RRC.

Up to now, when the dominant eigen vector is configured, only one polarization is considered in the X-pol antenna port, but the dominant eigen vector may be configured considering each X-pol polarization. That is, when rank1 is assumed, the eigen vector may be expressed as $$w = norm\left(\begin{bmatrix} e_1 \\ e_2 \end{bmatrix}\right).$$

Here, e_1 and e_2 may represent first eigen vectors (or in extension, k dominant eigen vectors) for the channels between the antenna ports and the UE, which correspond to "/" slant and "\" slant, respectively. Such a structure may be calculated by defining an antenna port group capable of performing coherent transmission. In other words, when each of a total of N_T antenna ports includes two panels and each panel supports only non-coherent transmission, the UE may calculate the eigen vectors by such a structure $$w = norm\left(\begin{bmatrix} e_1 \\ e_2 \end{bmatrix}\right)$$

and report the calculated eigen vectors. In this case, e_1 may represent an eigen vector(s) corresponding to a channel corresponding to a first panel and e_2 may represent an eigen vector(s) of a channel corresponding to a second panel.

Alternatively, the UE may derive a dominant eigen vector having a length of N_T through the SVD for an entire channel of N_R×N_T regardless of the antenna structure and feed back the derived dominant eigen vector.

And/or, in order to reduce the feedback overhead, the UE and the eNB may predetermine that the eigen vector corresponding to one polarization (or port group) is first calculated and the eigen vector corresponding to the remaining/the other polarization is calculated by applying a combining coefficient to the calculated eigen vector. This is expressed as shown in Equation 33.

$$w = norm\left(\begin{bmatrix} e_1 \\ \alpha_{n1}\phi_{n2}e_1 \end{bmatrix}\right) \quad \text{[Equation 33]}$$

In Equation 33, $\alpha_{n1}$ as a coefficient for adjusting the amplitude of the remaining/the other polarization may have values such as {0.25, 0.5, 0.75, 1} which are uniformly quantized, for example. Further, $\phi_{n2}$ as a coefficient for matching the co-phase component may have values of, for example, {1, −1, j, −j}.

In Equation 33, when e_1 represents a multiple value, i.e., a value of dominant k, an independent coefficient may be applied for each column as shown in Equation 34.

$$w = norm\left(\begin{bmatrix} e_1 & \cdots & e_k \\ \alpha_{n1,1}\phi_{n2,1}e_1 & \cdots & \alpha_{n1,k}\phi_{n2,k}e_k \end{bmatrix}\right) \quad \text{[Equation 34]}$$

Alternatively, only a specific coefficient, e.g., only an amplitude coefficient (or phase coefficient) may commonly adopt the same value ($\alpha_{n1,1}=\ldots=\alpha_{n1,k}$).

For performance enhancement of the explicit CSI feedback, the amplitude and phase information may be fed back together with the orthogonal basis (orthogonal beam matrix, Q) determined according to the proposed method. Alternatively, in order to reduce the feedback payload size, only any one of the amplitude and the phase may be reported. Alternatively, according to a channel environment of the UE, the UE may determine whether to feed back the amplitude and the phase and report whether to feed back the amplitude and the phase to the eNB. For example, since the necessity of amplitude feedback is not large in an environment in which line-of-sight (LOS) is dominant, the UE may report only the phase information. In this case, feedback of an additional 1-bit indicator for distinguishing whether the UE 'reports only the phase' or 'reports the phase and the amplitude' may be required.

Co-amplitude and co-phase information regarding the X-pol antenna may be reported jointly with one CSI related with explicit feedback or implicit feedback. Alternatively, the amplitude information (or phase information) and the phase information (or amplitude information) may be loaded on the explicit feedback and the implicit feedback, respectively and reported.

Further, the second embodiment (or second type) may be applied by using some indexes constituting the feedback codebook of the first embodiment (or first type) as a basis matrix index of the feedback of the second embodiment (or second type). That is, the UE may reduces a channel dimension using Q calculated in the first embodiment and then report the CSI using the second embodiment.

The eNB may inform the UE of which feedback scheme of the first to third types of the explicit feedback is to be used, which include schemes A and B described above through the RRC. And/or, since the trade-off exists between the feedback payload size for each type and the performance, the UE may directly determine which feedback scheme is appropriate considering a current channel environment and inform the eNB of the determined feedback scheme.

The channel information may be more accurately reported in the first to third types of the explicit feedback including schemes A and B described above as compared the implicit reporting/feedback scheme, but there is a disadvantage in that the feedback payload becomes very large. Accordingly, when the explicit feedback is applied, the number of antenna ports may be limited in such a manner that the explicit feedback is performed only for the number of specific antenna ports at a single instance.

For example, the eNB expects the explicit feedback only for a UE which is configured P-port (P<=8) and does not expect the explicit feedback for a UE which is configured P'-port (P'>8). The UE and the eNB may predetermine information on P or the eNB may inform the UE of the information on P through the RRC. And/or, the eNB may expect the explicit feedback only for a UE which is configured the beamformed CSI-RS (e.g., Class B of LTE-A).

Since the explicit feedback has a purpose of accurate channel/channel state feedback, channel measurement and estimation performance of the UE is also important. Accordingly, when the explicit CSI reporting/feedback is performed in an environment (e.g., CSI-RS density such as ⅓, ½, 1, etc.) in which various CSI-RS densities (RE/RB/port) may be configured, the UE may be limited/configured to be configured a highest CSI-RS density. In other words, when the UE is configured an explicit feedback mode, the UE does not expect that another density is configured other than the highest CSI-RS density. Here, the CSI-RS density means a density of a CSI-RS configuration/resource per RE, RB, or antenna port.

Since the explicit feedback has high channel estimation/measurement accuracy, the explicit feedback may be used for a transmission scheme (e.g., non-linear precoding (e.g., Tomlison-Harashima precoding and Vector perturbation precoding) that regards that channel accuracy is important. However, in the case of the non-linear precoding such as the example, a higher UE capability such as supporting a modular operation by the receiver is required. Accordingly, the explicit feedback may be configured/applied only for a UE that may support an advanced operation such as the modular operation and a UE that may not support the advanced operation does not expect that the explicit feedback is configured/applied.

Figure 21:
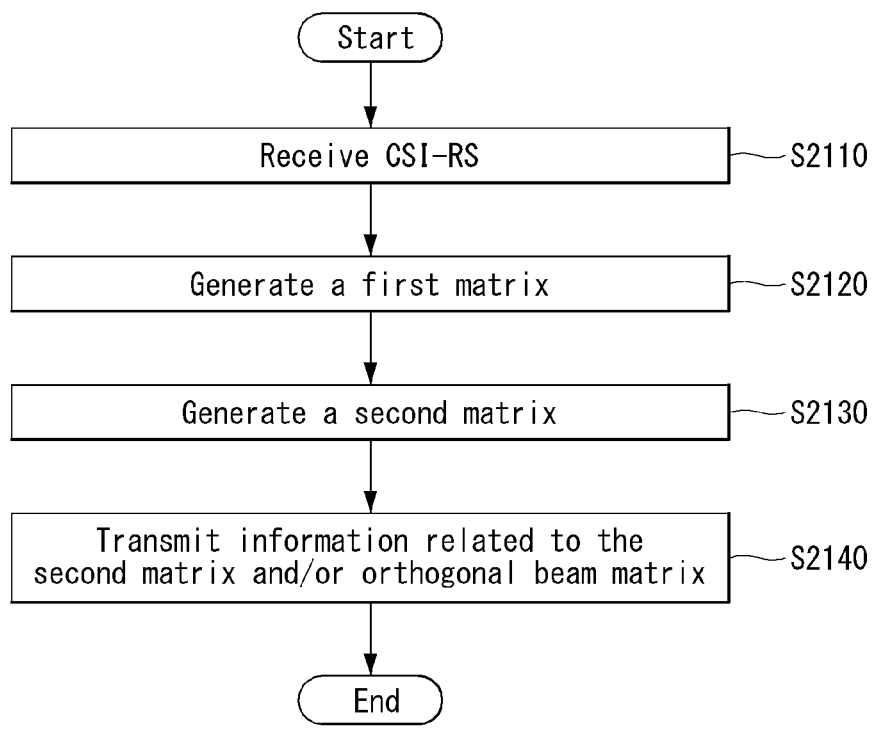
FIG. 21 is a flowchart illustrating a method for transmitting channel state information of a UE according to an embodiment of the present invention.

FIG. 21 is a flowchart illustrating a method for transmitting channel state information of a UE according to an embodiment of the present invention. The above-described embodiments associated with FIGS. 17 to 20 above may be applied in the same or similar manner with respect to this flowchart, and duplicated description will be omitted.

First, the UE may receive the CSI-RS to the eNB (S2110).

Next, the UE may generate a first matrix for a channel based on the CSI-RS (S2120). In this case, the generated first matrix may correspond to a channel covariance matrix, a dominant eigen vector having an eigen vector as an element, or a channel matrix.

Next, the UE may generate a second matrix having a lower dimension than the first matrix by calculating the first matrix and an orthogonal beam matrix having a lower dimension than the first matrix (S2130). More specifically, the UE may acquire/generate the second matrix by projecting the first matrix to the orthogonal beam matrix.

For example, when the first matrix corresponds to the channel covariance matrix, the second matrix may be generated according to Equation 22. In Equation 22 above, the R represents the second matrix having m×m dimensions, the Q represents the orthogonal beam matrix having N_T×m dimension with q_1 to q_m which are m orthogonal beams as the elements, the N_T represents the number of transmission antennas, the $Q^H$ represents a hermitian matrix of the Q, and the $H^H H$ represents the channel covariance matrix having N_T×N_T dimensions.

For example, when the first matrix corresponds to the dominant eigen matrix, the second matrix may be generated according to Equation 24. In Equation 24, the R represents the second matrix having m×m dimensions, the Q represents the orthogonal beam matrix having N_T×m dimension with q_1 to q_m which are m orthogonal beams as the elements, the N_T represents the number of transmission antennas, the Q^H represents the hermitian matrix of the Q, the U_k represents an eigen matrix having N_T×k dimensions with k eigen vectors as the elements, and the (U_k)^H represents the hermitian matrix of the U_k. In this case, the k value may be determined in association with the RI regarding the number of ranks and the RI may be explicitly indicated or implicitly indicated through the number of eigen values in which an absolute value is dominant among the eigen values acquired through the second matrix.

Next, the UE may transmit to the eNB information on the second matrix and/or the orthogonal beam matrix as the CSI (S2140). In this case, the orthogonal beam matrix may be a matrix including a plurality of orthogonal beams orthogonal to each other as elements. More specifically, the orthogonal beam matrix may be constituted by the plurality of orthogonal beams satisfying a predetermined condition among orthogonal beams in an orthogonal beam set determined based on a reference beam.

For example, the orthogonal beam matrix may be constituted by orthogonal beams in which the value ($|q_i{}^H H^H H q_i|$) calculated through Equation 27 exceeds a threshold among the orthogonal beams within the orthogonal beam set or orthogonal beams selected as many as k in an order in which the value ($|q_i{}^H H^H H q_i|$) calculated through Equation 27 above is larger. In Equation 27, q_i may represent a matrix of i-th orthogonal beams included in the orthogonal beam set, (q_i)^H may represent a hermitian matrix of q_i, H may represent the channel matrix, and H_H may represent the hermitian matrix of H. In this case, the threshold may be set to a predetermined value or indicated through the RRC signaling and k may be set to the number of dominant eigen vectors.

Alternatively, as another example, the orthogonal beam matrix may be constituted by orthogonal beams selected based on the SINR value or the correlation value with the dominant eigen vector among the orthogonal beams within the orthogonal beam set.

Alternatively, as another example, the plurality of orthogonal beams in the orthogonal beam matrix may be determined based on the codebook configuration which the UE is configured. More specifically, the plurality of orthogonal beams included in the orthogonal beam matrix may be determined as beams included in a beam group corresponding to the codebook configuration which the UE is configured. Accordingly, in this case, the UE may transmit to the eNB the index of the beam group and the RI indicating the number of ranks as information regarding the orthogonal beam matrix.

In this case, when the codebook configuration which the UE is configured corresponds to a beam group including non-orthogonal beams not orthogonal to each other, the information regarding the orthogonal beam matrix transmitted as the CSI may additionally include indication information regarding orthogonal beams satisfying orthogonality and selected to constitute the orthogonal beam matrix among the beams included in the codebook configuration.

Meanwhile, the information on the orthogonal beam matrix may be transmitted in a wideband and/or a long-term period and information on the second matrix may be transmitted in a subband and/or a short-term period.

Further, the CSI may not include a CQI and the RI or may further include a CQI and an RI calculated based on a PMI calculated by assuming a predetermined precoder.

Overview of Devices to which Present Invention is Applicable

Figure 22:
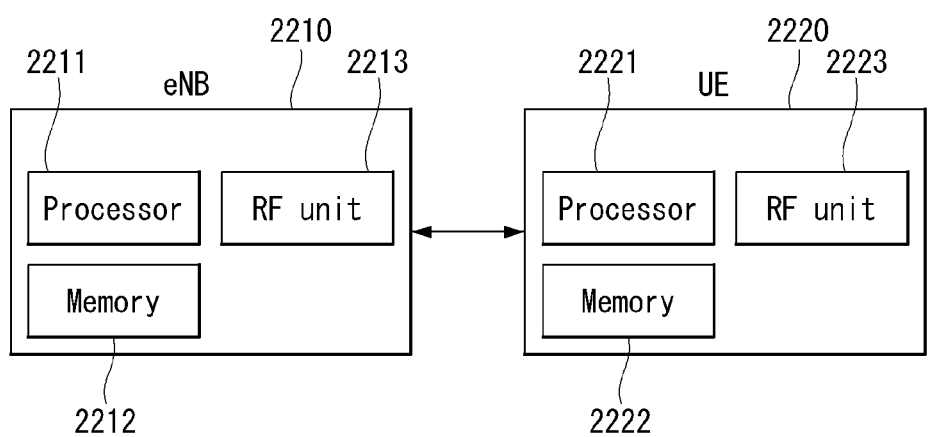
FIG. 22 illustrates a block diagram of a wireless communication device according to an embodiment of the present invention.

FIG. 22 illustrates a block diagram of a wireless communication device according to an embodiment of the present invention.

Referring to FIG. 22, a wireless communication system includes an eNB 2210 and multiple UEs 2220 positioned within an area of the eNB 2210.

The eNB 2210 includes a processor 2211, a memory 2212, and a radio frequency (RF) unit 2213. The processor 2211 implements a function, a process, and/or a method which are proposed in FIGS. 1 to 45 above. The layers of the wireless interface protocol may be implemented by the processor 2211. The memory 2212 is connected with the processor 2211 to store various pieces of information for driving the processor 2211. The RF unit 2213 is connected with the processor 2211 to transmit and/or receive a radio signal.

The UE 2220 includes a processor 2221, a memory 2222, and an RF unit 2223. The processor 2221 implements a function, a process, and/or a method which are proposed in FIGS. 1 to 21 above. The layers of the wireless interface protocol may be implemented by the processor 2221. The memory 2222 is connected with the processor 2221 to store various pieces of information for driving the processor 2221. The RF unit 2223 is connected with the processor 2221 to transmit and/or receive a radio signal.

The memories 2212 and 2222 may be positioned inside or outside the processors 2211 and 2221 and connected with the processors 2211 and 2221 by various well-known means. Further, the eNB 2210 and/or the UE 2220 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

MODE FOR INVENTION

Various modes for implementing the present invention are described in a best mode for implementing the present invention.

INDUSTRIAL APPLICABILITY

The present invention is described based on an example applied to the 3GPP LTE/LTE-A system, but it is possible to apply the present invention to various wireless communication systems in addition to the 3GPP LTE/LTE-A system.

The invention claimed is:

1. A method for transmitting channel state information (CSI) of terminal in a wireless communication system, the method comprising:
   receiving a CSI-reference signal (RS);
   generating a first matrix for a channel based on the CSI-RS, the first matrix being a channel covariance matrix or a dominant eigen matrix having an eigen vector as the element;
   generating a second matrix having a lower dimension than the first matrix based on projecting the first matrix to an orthogonal beam matrix having a lower dimension than the first matrix; and
   transmitting to a base station information on the second matrix and/or the orthogonal beam matrix as the CSI,
   wherein the orthogonal beam matrix is a matrix including a plurality of orthogonal beams orthogonal to each other as elements,
   wherein the orthogonal beam matrix includes the plurality of orthogonal beams in an orthogonal beam set determined based on a reference beam, and
   wherein the plurality of orthogonal beams include orthogonal beams in which a value calculated through Equation 3 exceeds a threshold value or orthogonal beams selected in an order in which the value calculated through Equation 3 is larger in the orthogonal beam set $$|q_i^H H^H H q_i| \quad \text{[Equation 3]}$$

where the q_i represents a matrix of an ith orthogonal beam included in the orthogonal beam set, the (q_i)^H represents the hermitian matrix of the q_i, the H represents a channel matrix, and the H_H represents the hermitian matrix of the H.

2. The method of claim 1, wherein when the first matrix is the channel covariance matrix, the second matrix is generated according to Equation 1

$$R(\in C^{m \times m}) = Q^H H^H H Q, Q = [q_1, q_2, \ldots, q_m] \in C^{N_T \times m} \quad \text{[Equation 1]}$$

where the R represents the second matrix having m×m dimensions, the Q represents the orthogonal beam matrix having N_T×m dimension with q_1 to q_m which are m orthogonal beams as the elements, the N_T represents the number of transmission antennas, the Q^H represents a hermitian matrix of the Q, and the $H^H H$ represents the channel covariance matrix having N_T×N_T dimensions.

3. The method of claim 1, wherein when the first matrix is the dominant eigen matrix, the second matrix is generated according to Equation 2

$$R(\in C^{m \times m}) = Q^H U_k U_k^H Q, U_k = [u_1, u_2, \ldots, u_k] \in C^{N_T \times k},$$
or
$$R(\in C^{m \times m}) = Q^H U_k \Sigma_k U_k^H Q, \Sigma_k = \text{diag}[\sigma_1^2, \sigma_2^2, \ldots, \sigma_k^2] \in C^{k \times k} \quad \text{[Equation 2]}$$

where the R represents the second matrix having m×m dimensions, the Q represents the orthogonal beam matrix having N_T×m dimension with q_1 to q_m which are m orthogonal beams as the elements, the N_T represents the number of transmission antennas, the Q^H represents the hermitian matrix of the Q, the U_k represents an eigen matrix having N_T×k dimensions with k eigen vectors as the elements, and the (U_k)^H represents the hermitian matrix of the U_k.

4. The method of claim 3, wherein the k value is determined in association with a rank indicator (RI) for the number of ranks.

5. The method of claim 4, wherein the RI is explicitly indicated or is implicitly indicated through the number of dominant eigen values whose absolute values are dominant among the eigen values obtained through the second matrix.

6. The method of claim 1, wherein the threshold value is set to a predetermined value or indicated through a radio resource control (RRC) signaling.

7. The method of claim 1, wherein the k represents the number of dominant eigen vectors.

8. The method of claim 1, wherein the orthogonal beam matrix is constituted by orthogonal beams selected based on a signal-to-interference-plus-noise ratio (SINR) value or a correlation value with the dominant eigen vector within the orthogonal beam set.

9. The method of claim 1, wherein the plurality of orthogonal beams of the orthogonal beam matrix is determined based on a codebook configuration configured by a user equipment (UE).

10. The method of claim 9, wherein information on the orthogonal beam matrix includes an index of a beam group in which the plurality of orthogonal beams are grouped and a rank indicator indicating the number of ranks.

11. The method of claim 10, wherein when the codebook configuration configured by the UE corresponds to a beam group including non-orthogonal beams which do not have orthogonality to each other, the information on the orthogonal beam matrix further includes indication information regarding orthogonal beams satisfying the orthogonality and selected to constitute the orthogonal beam matrix among the beams included in the beam group.

12. The method of claim 1, wherein the information on the orthogonal beam matrix is transmitted in a wideband and/or a long-term period and information on the second matrix is transmitted in a subband and/or a short-term period.

13. The method of claim 1, wherein the CSI does not include a channel quality indicator (CQI) and the RI or further includes a CQI and an RI calculated based on a precoding matrix index (PMI) calculated by assuming a predetermined precoder.

14. A terminal receiving a channel state information (CSI)-reference signal (RS) in a wireless communication system, the terminal comprising:

a radio frequency (RF) unit transmitting and receiving a radio signal; and
a processor for controlling the RF unit,
wherein the processor is configured to
receive a CSI-reference signal (RS),
generate a first matrix for a channel based on the CSI-RS, the first matrix being a channel covariance matrix or a dominant eigen matrix having an eigen vector as the element,
generate a second matrix having a lower dimension than the first matrix based on projecting the first matrix to an orthogonal beam matrix having a lower dimension than the first matrix, and
transmit to a base station information on the second matrix and/or the orthogonal beam matrix as the CSI,
wherein the orthogonal beam matrix is a matrix including a plurality of orthogonal beams orthogonal to each other as elements,
wherein the orthogonal beam matrix includes the plurality of orthogonal beams in an orthogonal beam set determined based on a reference beam, and
wherein the plurality of orthogonal beams include orthogonal beams in which a value calculated through Equation 3 exceeds a threshold value or orthogonal beams selected in an order in which the value calculated through Equation 3 is larger in the orthogonal beam set $$|q_i^H H^H H q_i| \qquad \text{[Equation 3]}$$

where the q_i represents a matrix of an ith orthogonal beam included in the orthogonal beam set, the (q_i)^H represents the hermitian matrix of the q_i, the H represents a channel matrix, and the H_H represents the hermitian matrix of the H.

\* \* \* \* \*